US012260823B2

(12) United States Patent
Lee et al.

(10) Patent No.: US 12,260,823 B2
(45) Date of Patent: Mar. 25, 2025

(54) PIXEL CIRCUIT AND DISPLAY DEVICE INCLUDING THE SAME

(71) Applicant: LG DISPLAY CO., LTD., Seoul (KR)

(72) Inventors: Dong Kyu Lee, Paju-si (KR); Seung Tae Jin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/532,843

(22) Filed: Dec. 7, 2023

(65) Prior Publication Data

US 2024/0212617 A1 Jun. 27, 2024

(30) Foreign Application Priority Data

Dec. 23, 2022 (KR) ........................ 10-2022-0183112

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2320/0233* (2013.01); *G09G 2358/00* (2013.01); *G09G 2380/10* (2013.01)

(58) Field of Classification Search
CPC .................................................... G09G 3/3233
See application file for complete search history.

(56) References Cited

U.S. PATENT DOCUMENTS

| | | | | |
|---|---|---|---|---|
| 2005/0259142 A1* | 11/2005 | Kwak | .................. | G09G 3/3233 347/238 |
| 2010/0013816 A1 | 1/2010 | Kwak | | |
| 2011/0074757 A1* | 3/2011 | Chung | ................. | G09G 3/3233 345/76 |
| 2016/0351124 A1* | 12/2016 | Kim | ..................... | G09G 3/3241 |
| 2017/0242549 A1* | 8/2017 | Lim | ....................... | G06F 3/0412 |
| 2020/0371386 A1* | 11/2020 | Liou | ..................... | G02F 1/1323 |
| 2022/0359577 A1* | 11/2022 | Jeong | ................... | G09G 3/2085 |

FOREIGN PATENT DOCUMENTS

| | | |
|---|---|---|
| KR | 10-2010-0009219 A | 1/2010 |
| KR | 10-2015-0064543 A | 6/2015 |
| KR | 10-2020-0144039 A | 12/2020 |

* cited by examiner

*Primary Examiner* — Nan-Ying Yang
(74) *Attorney, Agent, or Firm* — Morgan, Lewis & Bockius LLP

(57) ABSTRACT

Disclosed is a pixel circuit. The pixel circuit includes: a capacitor coupled between a first node and a second node; a driving element connected to a first constant voltage node, the second node, and a third node; a light emitting element connected to a fourth node and a second constant voltage node; a first switch element; a second switch element; a third switch element connected between the fourth node and the second constant voltage node or between the fourth node and a fourth constant voltage node; a fourth switch element connected between the first node and a third constant voltage node; a fifth switch element connected between the second node and the third constant voltage node or between the first node and the second node; and a sixth switch element connected between the third node and the fourth node.

20 Claims, 22 Drawing Sheets

PIXEL CIRCUIT AND DISPLAY DEVICE INCLUDING THE SAME

CROSS-REFERENCE TO RELATED APPLICATION

This application claims priority to and the benefit of Korean Patent Application No. 10-2022-0183112, filed Dec. 23, 2022, the disclosure of which is incorporated herein by reference in its entirety for all purposes.

BACKGROUND

1. Technical Field

The present disclosure relates to a pixel circuit and a display device including the same.

2. Discussion of the Related Art

An organic light-emitting display device an includes an organic light-emitting diode (hereinafter referred to as “OLED”) which emits light by itself, and has an advantage that its response speed is fast and its luminous efficiency, luminance, and viewing angle are large. The organic light-emitting display device has excellent contrast ratio and color reproducibility since it can express black grayscales in full black.

The organic light-emitting display device does not require a backlight unit, and may be implemented on a plastic substrate, a thin glass substrate, or a metal substrate, which is or is not a flexible material, without being limited thereto. Accordingly, flexible displays may be implemented with organic light-emitting display devices.

The description provided in the background section should not be assumed to be prior art merely because it is mentioned in or associated with the background section. The background section may include information that describes one or more aspects of the subject technology.

SUMMARY

Each of the pixels of the organic light-emitting display device includes a pixel circuit that drives the OLED. The pixel circuit includes a driving element that supplies current to the OLED.

There may be differences in electrical characteristics of driving elements between pixels due to, for example, process deviations and device characteristic deviations resulted, for example, from the manufacturing process of display panels. These differences may increase as the driving time of the pixels elapses. In order to compensate for the differences in the electrical characteristics of the driving element for each pixel, an internal compensation circuit may be added to the pixel circuit. The internal compensation circuit may, for example, sample a threshold voltage of the driving element and compensate a gate voltage of the driving element by the amount of the threshold voltage of the driving elements.

The OLED used as the light emitting device in the organic light-emitting display device contains capacitance due to its stacked structure. If the capacitance coupled to the OLED is small, the anode voltage of the OLED may change sensitively when the voltages to the nodes of the pixel circuit fluctuate. In this case, the luminance of the pixels in the black gray scale may increase.

The present disclosure has been made in an effort to address aforementioned necessities and/or drawbacks.

Accordingly, embodiments of the present disclosure are directed to a pixel circuit and a display device including the same that substantially obviates one or more of the problems due to limitations and disadvantages of the related art.

An aspect of the present disclosure is to provide a pixel circuit capable of preventing a fluctuation in the luminance of pixels and preventing a phenomenon of increasing the luminance of the pixels in a black gray scale, and a display device including the pixel circuit.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a pixel circuit comprises: a capacitor coupled between a first node and a second node; a driving element including a first electrode connected to a first constant voltage node, a gate electrode connected to the second node, and a second electrode connected to a third node; a light emitting element including an anode electrode connected to a fourth node and a cathode electrode connected to a second constant voltage node; a first switch element connected between the second node and the third node; a second switch element connected between a data line to which a data voltage is applied and the first node; a third switch element connected between the fourth node and the second constant voltage node or between the fourth node and the fourth constant voltage node; a fourth switch element connected between the first node and a third constant voltage node; a fifth switch element connected between the second node and the third constant voltage node or between the first node and the second node; and a sixth switch element connected between the third node and the fourth node.

A pixel driving voltage may be applied to the first constant voltage node. A cathode voltage lower than the pixel driving voltage may be applied to the second constant voltage node. A reference voltage lower than the pixel driving voltage and higher than the cathode voltage may be applied to the third constant voltage node. A second reference voltage lower than the reference voltage and higher than the cathode voltage may be applied to the fourth constant voltage node.

The third switch element may be turned on in response to the gate-on voltage of a first scan signal to connect the fourth node to the second constant voltage node, or to connect the fourth node to the fourth constant voltage nodes. The fifth switch element may be turned on in response to the gate-on voltage of a second-first scan signal to connect the second node to the third constant voltage node, or to connect the first node to the second node. The first switch element may be turned on in response to the gate-on voltage of a second-second scan signal to connect the second node to the third node. The second switch element may be turned on in response to the gate-on voltage of a second-second scan signal to connect the data line to the first node. The fourth switch element may be turned on in response to the gate-on voltage of a light emission control signal to connect the first node to the third constant voltage node. The sixth switch element may be turned on in response to the gate-on voltage of the light emission control signal to connect the third node to the fourth node. The first to sixth switch elements may be turned off in response to the gate-off voltage.

The driving period of the pixel circuit may include an initialization period, a sensing period, and a light emission period. During the initialization period, the voltage of the first scan signal, the second-first scan signal, and the light emission control signal may be the gate-on voltage. During the initialization period, the voltage of the second-second scan signal may be the gate-off voltage. During the sensing period, the voltage of the second-second scan signal and the first scan signal may be the gate-on voltage and the voltage of the second-first scan signal and the emission control signal may be the gate-off voltage. During the light emission period, the voltage of the first scan signal, the second-first scan signal and the second-second scan signal may be the gate-off voltage, and the voltage of the light emission control signal may be the gate-on voltage.

The first switch element may include a first electrode connected to the second node, a gate electrode to which the second-second scan signal is applied, and a second electrode connected to the third node. The second switch element may include a first electrode connected to the data line, a gate electrode to which the second-second scan signal is applied, and a second electrode connected to the first node. The third switch element may include a first electrode connected to the fourth node, a gate electrode to which the first scan signal is applied, and a second electrode connected to the second constant voltage node. The fourth switch element may include a first electrode connected to the first node, a gate electrode to which the light emission control signal is applied, and a second electrode connected to the third constant voltage node. The fifth switch element may include a first electrode connected to the second node, a gate electrode to which the second-first scan signal is applied, and a second electrode connected to the third constant voltage node. The sixth switch element may include a first electrode connected to the third node, a gate electrode to which the light emission control signal is applied, and a second electrode connected to the fourth node.

The first switch element may include a first electrode connected to the second node, a gate electrode to which the second-second scan signal is applied, and a second electrode connected to the third node. The second switch element may include a first electrode connected to the data line, a gate electrode to which the second-second scan signal is applied, and a second electrode connected to the first node. The third switch element may include a first electrode connected to the fourth node, a gate electrode to which the first scan signal is applied, and a second electrode connected to the fourth constant voltage node. The fourth switch element may include a first electrode connected to the first node, a gate electrode to which the light emission control signal is applied, and a second electrode connected to the third constant voltage node. The fifth switch element may include a first electrode connected to the second node, a gate electrode to which the second-first scan signal is applied, and a second electrode connected to the third constant voltage node. The sixth switch element may include a first electrode connected to the third node, a gate electrode to which the light emission control signal is applied, and a second electrode connected to the fourth node.

The first switch element may include a first electrode connected to the second node, a gate electrode to which the second-second scan signal is applied, and a second electrode connected to the third node. The second switch element may includes a first electrode connected to the data line, a gate electrode to which the second-second scan signal is applied, and a second electrode connected to the first node. The third switch element may include a first electrode connected to the fourth node, a gate electrode to which the first scan signal is applied, and a second electrode connected to the fourth constant voltage node. The fourth switch element may include a first electrode connected to the first node, a gate electrode to which the light emission control signal is applied, and a second electrode connected to the third constant voltage node. The fifth switch element may include a first electrode connected to the first node, a gate electrode to which the second-first scan signal is applied, and a second electrode connected to the second node. The sixth switch element may include a first electrode connected to the third node, a gate electrode to which the light emission control signal is applied, and a second electrode connected to the fourth node.

In another aspect, a pixel circuit comprises: a capacitor coupled between a first node and a second node; a driving element including a first electrode connected to a first constant voltage node, a gate electrode connected to the second node, and a second electrode connected to a third node; a first light emitting element including an anode electrode connected to a fourth node and a cathode electrode connected to a second constant voltage node; a second light emitting element including an anode electrode connected to a fifth node and a cathode electrode to which the second constant voltage node; a first switch element connected between the second node and the third node; a second switch element connected between a data line to which a data voltage is applied and the first node; a third switch element connected between the fourth node and the second constant voltage node or between the fourth node and the fourth constant voltage node; a fourth switch element connected between the first node and a third constant voltage node; a fifth switch element connected between the second node and the third constant voltage node or between the first node and the second node; a sixth switch element connected between the third node and the fourth element; and a seventh switch element connected between the third node and the fifth node.

In another aspect, a display device comprises: a display panel in which a plurality of data lines, a plurality of gate lines, and a plurality of pixel circuits are disposed; a data driver configured to output a data voltage of pixel data to the data lines; and a gate driver configured to output the gate signals to the gate lines.

According to the present disclosure, the anode electrode of the light emitting element may be initialized to the cathode voltage or the second reference voltage that is lower than the reference voltage in the initialization period and the sensing period of the pixel circuit, thereby preventing the change in the luminance of the pixels and the increase in the luminance of the black gray scale caused by the changes in the anode voltage. Therefore, a display quality of the display device is improved, and the display device can be driven with low power.

According to the present disclosure, the reference voltage may be applied to both ends of the capacitor in the pixel circuit, thereby stably initializing the capacitor.

According to the present disclosure, it is possible to prevent an increase in the luminance in the black gray scale in a pixel-divided display device, high-resolution display device, etc. with a small capacitor of the light emitting element.

According to the present disclosure, it is possible to implement an in-vehicle display device that is capable of providing the share mode and the privacy mode for each pixel and preventing an unnecessary fluctuation of the anode voltage of the light emitting element without increasing the luminance of the black gray scale.

Effects which can be achieved by the present disclosure are not limited to the above-mentioned effects. That is, other objects that are not mentioned may be obviously understood by those skilled in the art to which the present disclosure pertains from the following description.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

Figure 1:
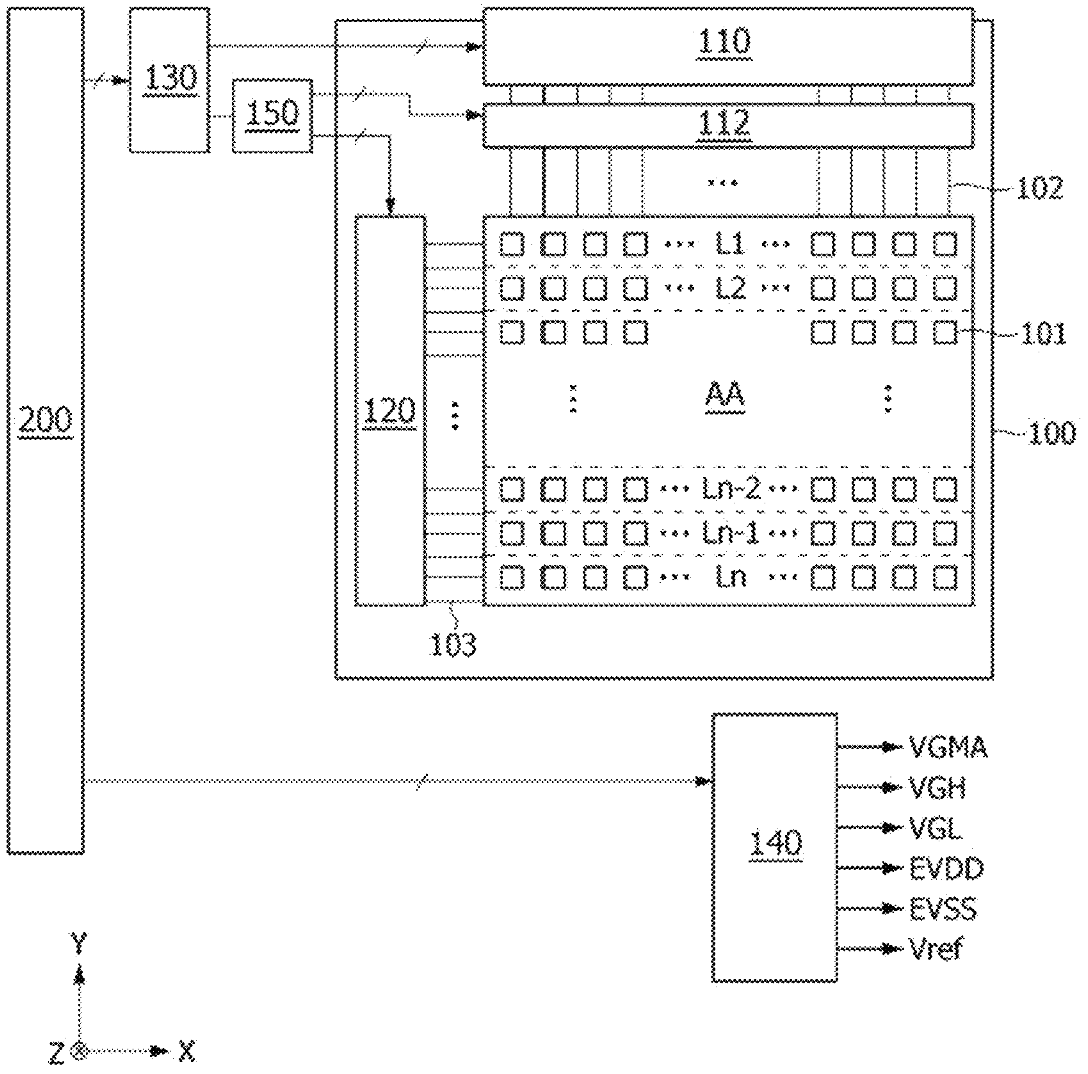
FIG. 1 is a block diagram illustrating a display device according to one exemplary embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION OF EXEMPLARY EMBODIMENTS

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Names of the respective elements used in the following explanations may be selected only for convenience of writing the specification and may be thus different from those used in actual products.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

Any implementation described herein as an "example" is not necessarily to be construed as preferred or advantageous over other implementations.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used.

The terms, such as "below," "lower," "above," "upper" and the like, may be used herein to describe a relationship between element(s) as illustrated in the drawings. It will be understood that the terms are spatially relative and based on the orientation depicted in the drawings.

The terms "first," "second," "A," "B," "(a)," and "(b)" and the like may be used to distinguish components from each other, but the functions or structures of the components are not limited by ordinal numbers or component names in front of the components.

The term "at least one" should be understood as including any and all combinations of one or more of the associated listed items. For example, the meaning of "at least one of a first item, a second item, and a third item" encompasses the combination of all three listed elements, combinations of any two of the three elements, as well as each individual element, the first element, the second element, and the third element.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

The following embodiments can be partially or entirely bonded to or combined with each other and can be linked and operated in technically various ways. The embodiments can be carried out independently of or in association with each other.

In the display device, a pixel circuit and a gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like. Further, each of the transistors may be implemented as a p-channel TFT or an n-channel TFT.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage.

Hereinafter, various embodiments of the present disclosure will be described in detail with reference to the accompanying drawings.

Figure 2:
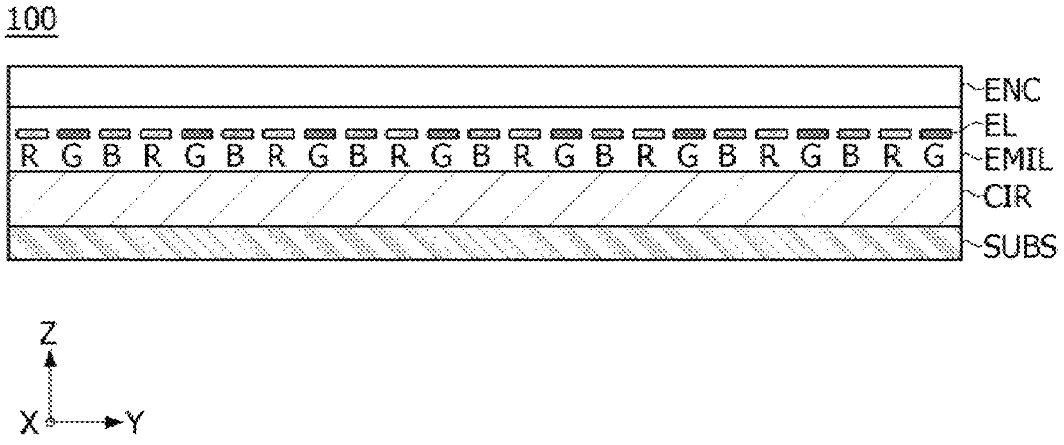
FIG. 2 is a cross-sectional view illustrating a cross-sectional structure of the display panel shown in FIG. 1 according to an exemplary embodiment of the present disclosure.

FIG. 1 is a block diagram illustrating a display device according to one exemplary embodiment of the present disclosure. FIG. 2 is a cross-sectional view illustrating a cross-sectional structure of the display panel shown in FIG. 1 according to an exemplary embodiment of the present disclosure.

Referring to FIGS. 1 to 2, the display device according to an exemplary embodiment of the present disclosure includes a display panel 100, a display panel driving circuit for writing pixel data to pixels of the display panel 100, and a power circuit 140 for generating power necessary for driving the pixels and the display panel driving circuit.

The display panel 100 may be a panel having a rectangular structure with a length in the X-axis direction, a width in the Y-axis direction, and a thickness in the Z-axis direction, without being limited thereto. As an example, the display panel 100 may be a panel having a rectangular structure with a length in the Y-axis direction, a width in the X-axis direction. As another example, the display panel 100 may be a panel having a structure of any shape such as a square shape, a circle shape, an oval shape, etc. A display area AA on the display panel 100 includes a pixel array for displaying an input image thereon. The pixel array includes a plurality of data lines 102, a plurality of gate lines 103 intersecting the data lines 102, and pixels 101 which are disposed in a matrix form at intersections of the plurality of data lines 102 and plurality of gate lines 103. The display panel 100 may further include power lines (e.g., commonly) connected to the pixels 101. The power lines are connected to constant voltage nodes of the pixel circuits and supply a constant voltage necessary for driving the pixels 101 to the pixels 101.

Each of the pixels 101 may be divided into a red sub-pixel, a green sub-pixel, and a blue sub-pixel for color implementation. Each of the pixels may further include a white sub-pixel. Colors of the sub-pixels are not limited thereto, and may be any other color such as cyan, magenta, yellow, etc. As an example, each of the sub-pixels includes a pixel circuit for driving a light-emitting element. The pixel circuits may be connected to data lines, gate lines, and/or power lines.

The pixels may be disposed as real color pixels and/or pentile pixels, etc. A pentile pixel may realize a higher resolution than the real color pixel by driving two sub-pixels having different colors as one pixel 101 through the use of a preset pixel rendering algorithm. Pixel rendering algorithms may compensate for insufficient color representation in each pixel with the color of light emitted from an adjacent pixel.

The pixel array includes a plurality of pixel lines L1 to Ln. Each of the pixel lines L1 to Ln includes one line of pixels arranged along the line direction (e.g., X-axis direction) in the pixel array of the display panel 100. As an example, sub-pixels arranged in one pixel line share the gate lines 103 (e.g., the same gate line). Sub-pixels arranged, for example, in the column direction Y, along a data line direction share the same data line 102. As an example, one horizontal period is a time obtained by dividing one frame period by the total number of the pixel lines L1 to Ln, without being limited thereto.

The display panel 100 may be implemented as a non-transmissive display panel or a transmissive display panel. The transmissive display panel may be applied to a transparent display device in which an image is displayed on a screen and an actual background is visible. The display panel 100 may be manufactured as a flexible display panel or a non-flexible display panel.

The cross-sectional structure of the display panel 100 may include a circuit layer CIR, a light-emitting element layer EMIL, and an encapsulation layer ENC stacked on a substrate SUBS, as shown in FIG. 2, without being limited thereto. The cross-sectional structure of the display panel 100 may further include other components, such as a buffer layer, an adhesive layer, a touch sensor layer, a color filter layer, etc.

The circuit layer CIR may include a thin-film transistor (TFT) array including a pixel circuit connected to wirings such as a data line, a gate line, a power line, and the like. As an example, the circuit layer CIR may further include a de-multiplexer array 112, and/or a gate driver 120. The circuit layer CIR includes a plurality of metal layers insulated with organic and/or inorganic insulating layers interposed therebetween, and a semiconductor material layer.

The light-emitting element layer EMIL may include a light-emitting element driven by the pixel circuit. The light-emitting element may include a light-emitting element of a red sub-pixel, a light-emitting element of a green sub-pixel, and a light-emitting element of a blue sub-pixel. The light-emitting element layer EMIL may further include a light-emitting element of white sub-pixel. Embodiments are not limited thereto. As an example, the light-emitting element may also include a light-emitting element of a sub-pixel of other colors. The light-emitting element layer EMIL corresponding to each of the sub-pixels may have a structure in which a light-emitting element and a color filter are stacked, without being limited thereto. As an example, the color filter may be omitted according to the design. The light-emitting elements EL in the light-emitting element layer EMIL may be covered by a single protective layer or multiple protective layers including an organic film and/or an inorganic film.

The encapsulation layer ENC covers the light-emitting element layer EMIL to seal the circuit layer CIR and the light-emitting element layer EMIL. The encapsulation layer ENC may have a single-insulating film structure or a multi-insulating film structure in which an organic film and an inorganic film are/or alternately stacked. The inorganic film may reduce or block permeation of moisture and oxygen. The organic film may planarize the surface of the inorganic film. When the organic layer and the inorganic layer are stacked in multiple layers, the movement path of moisture and oxygen becomes longer than that of a single layer, so that penetration of moisture and oxygen affecting the light-emitting element layer EMIL may be effectively reduced or blocked.

A touch sensor layer (not shown) may be formed on the encapsulation layer ENC, and a polarizing plate or a color filter layer may be disposed thereon, without being limited thereto. As an example, at least one of these layers could be omitted according to the design. The touch sensor layer may include capacitive touch sensors (e.g., mutual capacitance structure or self-capacitance touch electrode structure) that sense a touch input based on a change in capacitance before and after the touch input. The touch sensor layer may have metal wiring patterns and insulating films that form the capacitance of the touch sensors. As another example, a sensing electrode and lines of the touch sensor layer may be made of a transparent material such as indium tin oxide (ITO) or a metal mesh, thereby increasing light transmittance. The insulating films may insulate an area where the metal wiring patterns intersect and for example, may further planarize the surface of the touch sensor layer. The polarizing plate may improve visibility and contrast ratio by converting the polarization of light, for example, external light reflected by metal in the touch sensor layer and the circuit layer, for example, the polarizing plate may reduce the reflection of light from a surface of the display panel 100 and block the light reflected from metal of the circuit layer, thereby improving the brightness of the pixels. The polarizing plate may be implemented as a circular polarizing plate or a polarizing plate in which a linear polarizing plate and a phase retardation film are bonded together, without being limited thereto. As an example, a cover glass may be further adhered to the polarizing plate. The color filter layer may include red, green, and blue color filters, without being limited thereto. The color filter layer may further include a black matrix pattern. As an example, the color filter layer may replace the polarizing plate by absorbing a part of the wavelength of light reflected from the circuit layer and the touch sensor layer, and increase the color purity of an image reproduced in the pixel array.

The power circuit 140 generates voltages (e.g., DC voltages or constant voltages) necessary for driving the pixel array of the display panel 100 and the display panel driving circuit using, for example, a DC-DC converter. The pixel array AA may include a plurality of pixel lines L1 to Ln. Each of the pixel lines L1 to Ln includes pixels of one line arranged along a line direction (X-axis direction) in the pixel array AA of the display panel 100. The DC-DC converter may include a charge pump, a regulator, a buck converter, a boost converter, and/or the like. The power circuit 140 may generate the constant voltages such as a gamma reference voltage VGMA, a gate-on voltage VGL, a gate-off voltage VGH, a pixel driving voltage EVDD, a cathode voltage EVSS, a reference voltage Vref, and the like by adjusting the level of a DC input voltage applied from an external device such as a host system 200. The gamma reference voltage VGMA is supplied to a data driver 110. The gate-on voltages and the gate-off voltages may be supplied to the gate driver 120. The dynamic range of the data voltage outputted from the data driver 110 is determined by the voltage range of the gamma reference voltage. The dynamic range of the data voltage is the range of voltages between the uppermost gray scale voltage and the lowermost gray scale voltage. Depending on a gray scale value of the pixel data, a voltage level of the data voltage is selected. The voltage level outputted from the power circuit 140 may be adjusted under the control of a control circuit such as the host system 200 or the timing controller 130, etc. The constant voltages, such as the pixel driving voltage, the low potential power voltage, and the like may be supplied to the pixels 101 through the power lines commonly connected to the pixels 101. The constant voltages applied to the pixel circuit may have different voltage levels.

The gate-on voltage VGL and the gate-off voltage VGH are supplied to a level shifter 150 and the gate driver 120. The constant voltages such as the pixel driving voltage EVDD, the cathode voltage EVSS and the reference voltage Vref are supplied to the pixels 101 through the power lines (e.g., commonly) connected to the pixels 101.

As anther example, the pixel driving voltage EVDD may be outputted from a main power source of the host system 200 and supplied to the display panel 100. In this case, the power circuit 140 does not need to output the pixel driving voltage EVDD.

The display panel driving circuit writes pixel data of an input image to the pixels of the display panel 100 under the control of the timing controller 130. The display panel driving circuit may at least include the data driver 110 and the gate driver 120. The display panel driving circuit may further include a de-multiplexer array 112 disposed between the data driver 110 and the data lines 102, without being limited thereto.

The de-multiplexer array 112 sequentially supplies the data voltages outputted from channels of the data driver 110 to the data lines 102 using a plurality of de-multiplexers DEMUX. The de-multiplexer may include a multiple of switch elements disposed, for example, on the display panel 100. When the de-multiplexer may be disposed between the output terminals of the data driver 110 and the data lines 102, the number of channels of the data driver 110 may be reduced. For example, the demultiplexer 112 may time-divisionally distribute the data voltage Vdata output through the channels of the data driver 110 to the plurality of data lines DL. However, the present disclosure is not necessarily limited thereto, and the de-multiplexer array 112 may be omitted.

The display panel driving circuit may further include a touch sensor driver for driving touch sensors. The touch sensor driver is omitted from FIG. 1. The data driver 110, the timing controller 130, the power supply 140, and/or the touch sensor driver may be integrated into one drive IC (Integrated Circuit). In a mobile terminal or a wearable terminal, the timing controller 130, the level shifter 150, the data driver 110, the touch sensor driver, and the like may be integrated into one drive IC (DIC), without being limited thereto. The touch sensor driver may be omitted.

The data driver 110 receives pixel data of an input image received as a digital signal from the timing controller 130 and outputs a data voltage. The channels of the data driver 110 include a digital to analog converter (DAC). The data driver 110 converts the pixel data of an input image into a gamma compensation voltage and outputs the data voltage at each frame period in a normal driving mode using a digital-to-analogue converter (DAC). The gamma reference voltage VGMA inputted to the DAC is divided by a voltage divider circuit into a gamma compensation voltage for each grayscale. The gamma compensation voltage for each grayscale is provided to the DAC in the data driver 110. The data voltage is outputted via, for example, an output buffer from each of the channels of the data driver 110.

The gate driver 120 may be formed in the circuit layer CIR on the display panel 100 together with the TFT array of the pixel array and the wirings, for example, the gate driver 120 may be implemented as a gate-in-panel (GIP) circuit formed directly in a bezel area BZ on the display panel 100 together with a TFT array of the pixel array. The gate driver 120 may sequentially output the gate signal to the gate lines 103 under the control of the timing controller 130. The gate driver 120 may shift the gate signal by using a shift register to sequentially supply the gate signal to the gate lines 103. The gate driver 120 may be disposed in a bezel BZ, which is non-display region of the display panel 100, or may be distributed and disposed in a pixel array in which an input image is reproduced. Embodiments are not limited thereto. As an example, the gate driving circuit 120 may be connected to the display panel 110 in a tape automated bonding (TAB) type, or connected to the display panel 110 in a chip on glass (COG) type or a chip on panel (COP) type, or connected to the display panel 110 in a chip on film (COF) type.

The gate driver 120 may be disposed in the bezel BZ. As an example, the gate driver 120 may be disposed in the bezel BZ on opposite sides of the display panel 100 with the display area of the display panel interposed therebetween and may supply gate pulses from the opposite sides of the gate lines 103 in a double feeding method. In another embodiment, the gate driver 120 may be disposed on either the left or right bezel of the display panel 100 to supply gate signals to the gate lines GL in a single feeding method. The gate driver 120 sequentially outputs pulses of the gate signals to the gate lines 103 under the control of the timing controller 130. The gate driver 120 may sequentially supply the gate signals to the gate lines 103 by shifting pulses of the gate signals using a shift register.

Figure 3:
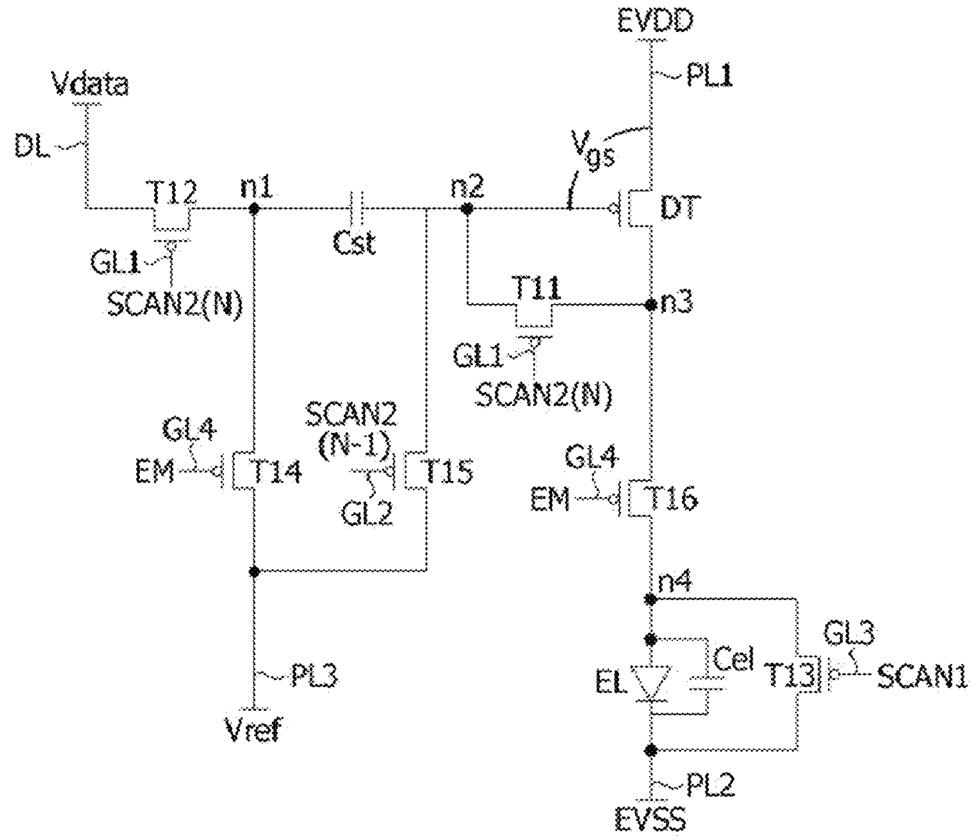
FIG. 3 is a circuit diagram illustrating a pixel circuit including an internal compensation circuit according to a first exemplary embodiment of the present disclosure.
Figure 4:
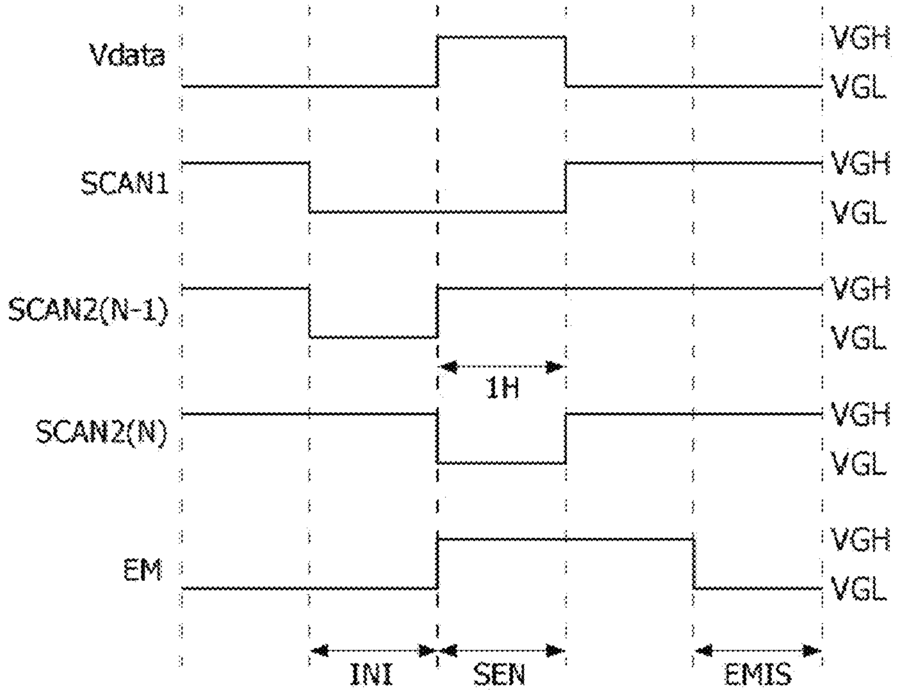
FIG. 4 is a waveform diagram illustrating gate signals inputted to the pixel circuit shown in FIG. 3 according to an exemplary embodiment of the present disclosure.

The gate driver 120 may include a plurality of shift registers that output pulses of the gate signals. The gate signals may include a first scan signal SCAN1, second-first and second-second scan signals SCAN2(N−1) and SCAN2(N), and a light emission control signal (hereinafter referred to as "EM signal"), as shown in FIGS. 3 and 4, without being limited thereto. At least one of these signals could be omitted. The gate driver 120 may include a first shift register for sequentially outputting a pulse of the first scan signal SCAN1, a second shift register for sequentially outputting pulses of the second-first and second-second scan signals SCAN2(N−1) and SCAN2(N), and a third shift register for sequentially outputting a pulse of the EM signal, without being limited thereto. At least one of these shift registers could be omitted.

The timing controller 130 may receive from the host system 200 pixel data of an input image and a timing signal synchronized with the pixel data. The timing signal may include a vertical synchronization signal Vsync, a horizontal synchronization signal Hsync, a clock CLK, and a data enable signal DE, etc. Because a vertical period (or frame period) and a horizontal period may be known by counting the data enable signal DE, the vertical synchronization signal Vsync and the horizontal synchronization signal Hsync may be omitted. The data enable signal DE has a cycle of one horizontal period (1H).

The timing controller 130 generates a data timing control signal for controlling the operation timing of the data driver 110 based on the timing signals Vsync, Hsync, and DE received from the host system 200, a MUX control signal for controlling the operation timing of the de-multiplexer array 112, and/or a gate timing control signal for controlling the operation timing of the gate driver 120. The timing controller 130 synchronizes the data driver 110, the de-multiplexer array 112, the touch sensor driver, and/or the gate driver 120 by controlling the operation timings of the display panel driving circuit.

The MUX control signal and the gate timing control signal outputted from timing controller 130 may be inputted to the de-multiplexer array 112 and the gate driver 120 through the level shifter 150, without being limited thereto. The level shifter 150 may convert a voltage of the MUX control signal received from the timing controller 130 into a swing width between the gate on voltage VGL and the gate off voltage VGH and supply it to the de-multiplexer array 112. The level shifter 150 may receive the gate timing control signal and generate a start pulse and a shift clock that swing between the gate on voltage and the gate off voltage to provide them to the gate driver 120. Embodiments are not limited thereto. As an example, the level shifter 150 may be omitted according to the design. In this case, the MUX control signal and/or the gate timing control signal outputted from timing controller 130 may be inputted to the de-multiplexer array 112 and the gate driver 120 directly.

The host system 200 may include a main board of any one of a television (TV) system, a set-top box, a navigation system, a personal computer (PC), a vehicle system, a home theater system, a camera, a mobile terminal, and a wearable terminal, etc. The host system may scale an image signal from a video source to match the resolution of the display panel 100, and may transmit it to the timing controller 130 together with the timing signal.

The pixel circuit of each of the sub-pixels includes a light emitting element, a driving element that generates a current according to a gate-source voltage Vgs to drive the light emitting element, and a capacitor to maintain the gate-source voltage of the driving element. The driving element may be implemented as a transistor. In order to make the image quality of an entire screen of the organic light-emitting display device uniform, it is preferable that the driving element has uniform electrical characteristics among all pixels. However, due to device characteristic deviations and process deviations caused by the manufacturing process of the display panel 100, there may be a difference in the electrical characteristic of the driving element for each pixel, and such difference in electrical characteristic may increase as the driving time of the pixels elapses. Internal compensation technologies and/or external compensation technologies may be used to compensate for the deviations in the electrical characteristic and the variations of the driving element for each pixel. In an internal compensation technology, a threshold voltage of a driving element is sensed for each sub-pixel and a data voltage is compensated by the threshold voltage using a pixel circuit including an internal compensation circuit.

FIG. 3 is a circuit diagram illustrating a pixel circuit including an internal compensation circuit according to a first exemplary embodiment of the present disclosure. The pixel circuit illustrated in FIG. 3 exemplifies any sub-pixel circuit disposed on an Nth pixel line (where N is a natural number). The pixel circuit includes an internal compensation circuit that senses a threshold voltage Vth of a driving element DT and compensates a data voltage Vdata by an amount of the threshold voltage Vth. FIG. 4 is a waveform diagram illustrating gate signals inputted to the pixel circuit shown in FIG. 3 according to an exemplary embodiment of the present disclosure.

Referring to FIGS. 3 and 4, the pixel circuit includes a light emitting element EL, the driving element DT for driving the light emitting element EL, a plurality of switch elements T11 to T16, and a capacitor Cst. The driving element DT and the switch elements T11 to T16 may be implemented as, but not limited to, p-channel transistors. As an example, at least one of the driving element DT and the switch elements T11 to T16 may be implemented as a n-channel transistor. In the case of an n-channel transistor, the gate-on voltage may be a gate-high voltage, and the gate-off voltage may be a gate-low voltage. In the case of a p-channel transistor, the gate-on voltage may be the gate-low voltage and the gate-off voltage may be the gate-high voltage.

The pixel circuit is connected to a data line DL to which a data voltage Vdata is applied, and to gate lines GL1 to GL4 to which gate signals SCAN1, SCAN2(N−1), SCAN2(N), and EM are applied.

The pixel circuit is connected to power nodes to which DC voltages (or constant voltages) are applied, such as a first constant voltage node PL1 to which a pixel driving voltage EVDD is applied, a second constant voltage node PL2 to which a cathode voltage EVSS is applied, and a third constant voltage node PL3 to which a reference voltage Vref is applied. On the display panel 100, the power lines to which the constant voltage nodes are connected may be commonly connected to all pixels, without being limited thereto.

The pixel driving voltage EVDD may be set to a voltage which enables the driving element DT to operate in a saturation region. As an example, the pixel driving voltage EVDD may be set to a voltage which is higher than a maximum voltage of the data voltage Vdata. The pixel driving voltage EVDD is higher than the cathode voltage EVSS. The reference voltage Vref may be set to a voltage lower than the pixel driving voltage EVDD and higher than the cathode voltage EVSS. The gate-off voltage VGH may be set to a voltage higher than the pixel driving voltage EVDD, and the gate-on voltage VGL may be set to a voltage lower than the cathode voltage EVSS. For example, but not limited to, EVDD=13[V], EVSS=0[V], Vref=2.5[V], VGH=14[V], and VGL=−9[V]. But embodiments are not limited thereto. As an example, the gate-off voltage VGH may be set to a voltage equal to or lower than the pixel driving voltage EVDD, and a gate-on voltage VGL may be set to a voltage equal to or higher than the cathode voltage EVSS, as long as the gate-off voltage VGH may turn off the corresponding transistor, and the gate-on voltage VGL may turn on the corresponding transistor. Furthermore, depending on the type of the transistors, as an example, a gate-on voltage VGL may be set to a voltage higher than the gate-off voltage VGH. As an example, the gate-on voltage VGL may be set to a voltage higher than the pixel driving voltage EVDD and the gate-off voltage VGH may be set to a voltage lower than the pixel base voltage EVSS, without being limited thereto.

The gate signals SCAN1, SCAN2(N−1), SCAN2(N), and EM include pulses that swing between the gate-on voltage VGL and the gate-off voltage VGH.

The pixel circuit is driven in the following order: an initialization period INI, a sensing period SEN, and a light emission period EMIS. The initialization period INI, the sensing period SEN, and the light emission period EMIS may be determined by waveforms of the gate signals SCAN1, SCAN2(N−1), SCAN2(N), and EM.

The pulses of the second-first and second-second scan signals SCAN2(N−1) and SCAN2(N) include a pulse of the gate-on voltage VGL whose phase is shifted sequentially. The pulses of the second-first and second-second scan signals SCAN2(N−1) and SCAN2(N) have a pulse width of one horizontal period (1H). The EM signal EM includes a pulse of the gate-off voltage VGH generated during the sensing period SEN. The EM signal EM has a pulse width of two horizontal periods.

The driving element DT generates a current according to a gate-source voltage Vgs to drive the light emitting element EL. The driving element DT includes a first electrode connected to the first constant voltage node PL1 to which the pixel driving voltage EVDD is applied, a gate electrode connected to a second node n2, and a second electrode connected to a third node n3.

The light emitting element EL may be implemented as an OLED, LEDs, micro-LEDs, mini-LEDs, etc. The light emitting element EL includes an anode electrode, a cathode electrode, and an organic compound layer formed between the electrodes. The anode electrode of the light emitting element EL is connected to a fourth node n4, and the cathode electrode is connected to the second constant voltage node PL2 to which the cathode voltage EVSS is applied. A capacitor Cel is connected between the anode electrode and the cathode electrode of the light emitting element EL. The organic compound layer may include, but is not limited to, a hole injection layer HIL, a hole transport layer HTL, an light emission layer EML, an electron transport layer ETL, and an electron injection layer EIL. When a voltage is applied to the anode and cathode electrodes of the light emitting element EL, holes passing through the hole transport layer HTL and electrons passing through the electron transport layer ETL move to the emission layer EML to form excitons. In this case, visible light is emitted from the light emission layer EML. But embodiments are not limited thereto. As an example, at least one of the hole injection layer HIL, the hole transport layer HTL, the electron transport layer ETL, and the electron injection layer EIL may be omitted. As an example, the light emitting element EL may be implemented as a tandem structure with a plurality of light emitting layers stacked on top of each other. The light emitting element EL having the tandem structure may improve the luminance and lifespan of pixels.

The capacitor Cel of the light emitting element may depend on a light emission efficiency and a white light contribution rate. For example, the capacitor Cel of the light emitting element EL disposed in a red sub-pixel may be smaller compared to green and blue sub-pixels. The capacitor Cel of the light emitting element EL disposed in the blue sub-pixel may be larger compared to the red and green sub-pixels. But embodiments are not limited thereto. As an example, the capacitors Cel of the light emitting elements EL disposed in the red, blue and green sub-pixels may be the same or may be different from each other. For the red sub-pixel, since the capacitor Cel of the light emitting element EL has a smaller capacitance, when an anode voltage of the light emitting element EL is fluctuated, an amount of fluctuation of the charges of the capacitor Cel is sensitively changed, which may cause the luminance of the light emitting element EL to fluctuate and the luminance in the black gray scales to increase. According to the present disclosure, the anode electrode of the light emitting device EL may be connected to the cathode voltage EVSS lower than the reference voltage Vref during the initialization period INI and/or the sensing period SEN to reduce or suppress the fluctuation of the anode voltage, thereby reducing or preventing the fluctuation of the luminance of the light emitting element EL and the increase of the luminance of the black gray scale.

The capacitor Cst is connected between the first node n1 and the second node n2. During the sampling period SEN, the data voltage Vdata, in which the threshold voltage Vth of the driver element DT is compensated, is stored in the capacitor Cst. The capacitor Cst maintains the gate-source voltage Vgs of the driving element DT during the light emission period EMIS.

A first witch element T11 is connected between the second node n2 and a third node n3. The first switch element T11 is turned on according to the gate-on voltage VGL of the second-second scan signal SCAN2(N) during the sensing period SEN to connect the gate electrode and the second electrode of the driving element DT. The first switch element T11 includes a first electrode connected to the second node n2, a gate electrode connected to a first gate line GL1 to which the pulse of the second-second scan signal SCAN2 (N) is applied, and a second electrode connected to the third node n3.

A second switch element T12 is connected between the data line DL and the first node n1. The second switch element T12 is turned on according to the gate-on voltage VGL of the second-second scan signal SCAN2(N) during the sensing period SEN to apply the data voltage Vdata of the pixel data to an electrode of the capacitor Cst. The second switch element T12 includes a first electrode connected to the data line DL, a gate electrode connected to the first gate line GL1 to which the pulse of second-second scan signal SCAN2(N) is applied, and a second electrode connected to the first node n1.

A third switch element T13 is connected between the fourth node n4 and the second constant voltage node PL2. The third switch element T13 is turned on according to the gate-on voltage VGL of the first scan signal SCAN1 during the initialization period INI and the sensing period SEN to initialize the anode voltage of the light emitting element EL to the cathode voltage EVSS. When the third switch element T13 is turned on, the fourth node n4 is connected to the second constant voltage node PL2 to which the cathode voltage EVSS is applied. The third switch element T13 includes a first electrode connected to the fourth node n4, agate electrode connected to the third gate line GL3 to which the first scan signal SCAN1 is applied, and a second electrode connected to the second constant voltage node PL2.

A fourth switch element T14 is connected between the first node n1 and the third constant voltage node PL3. The fourth switch element T14 is turned on according to the gate-on voltage VGL of the EM signal EM during the initialization period INI and the light emission period EMIS to connect the first node n1 to the third constant voltage node PL3 to which the reference voltage Vref is applied. The fourth switch element T14 includes a first electrode connected to the first node n1, a gate electrode connected to a fourth gate line GL4 to which the EM signal EM is applied, and a second electrode connected to the third constant voltage node PL3.

A fifth switch element T15 is connected between the second node n2 and the third constant voltage node PL3. The fifth switch element T15 is turned on according to the gate-on voltage VGL of the second-first scan signal SCAN2 (N−1) during the initialization period INI to connect the second node n2 to the third constant voltage node PL3. The fifth switch element T15 includes a first electrode connected to the second node n2, a gate electrode connected to the second gate line GL2 to which the second-first scan signal SCAN2(N−1) is applied, and a second electrode connected to the third constant voltage node PL3.

A sixth switch element T16 is connected between the third node n3 and the fourth node n4. The sixth switch element T16 is turned on according to the gate-on voltage VGL of the EM signal EM during the initialization period INI and the light emission period EMIS to connect the second electrode of the driving element DT to the anode electrode of the emitting element EL. The sixth switch element T16 includes a first electrode connected to the third node n3, a gate electrode connected to the fourth gate line GL4 to which the EM signal EM is applied, and a second electrode connected to the fourth node n4.

Figure 5A:
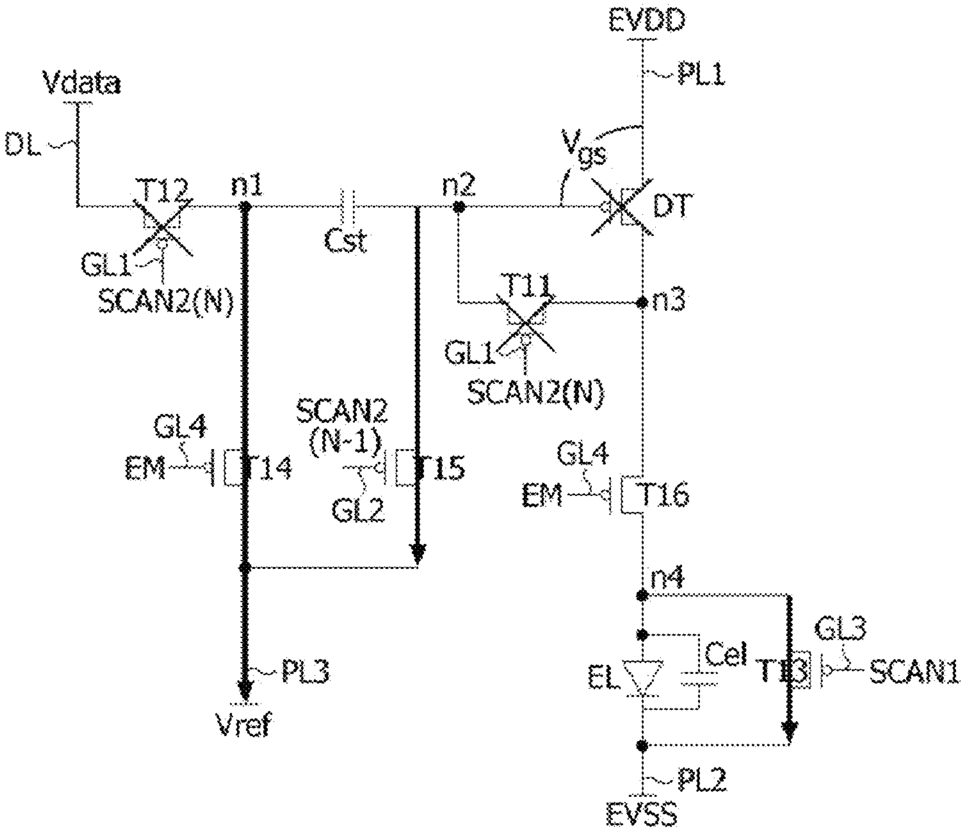
FIGS. 5A to 5C are circuit diagrams illustrating the operation of each internal compensation step of the pixel circuit illustrated in FIG. 3 according to an exemplary embodiment of the present disclosure.
Figure 5B:
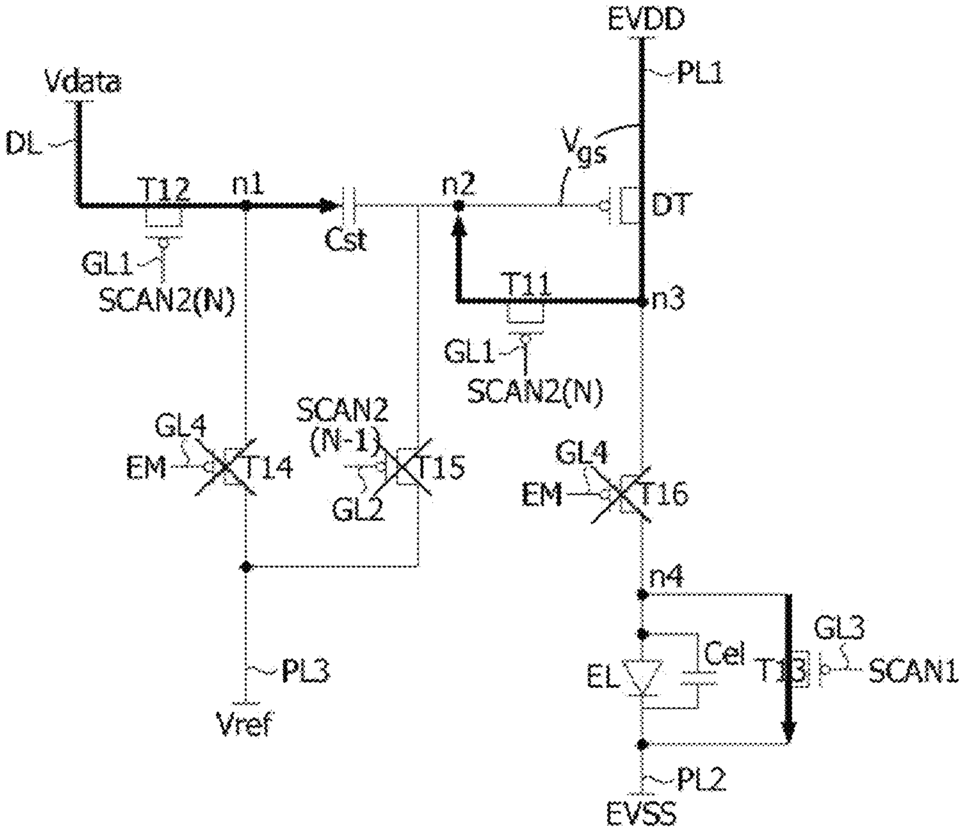
Figure 5C:
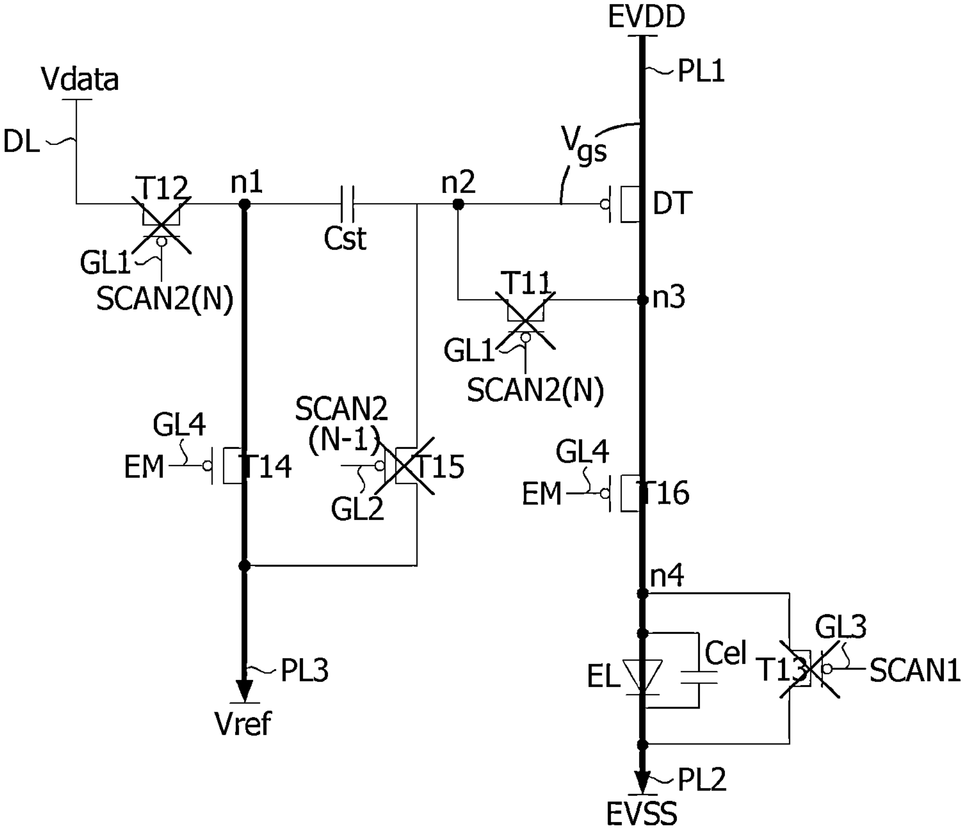

FIGS. 5A to 5C are circuit diagrams illustrating the operation of each internal compensation step of the pixel circuit illustrated in FIG. 3 according to an exemplary embodiment of the present disclosure. FIG. 5A is a circuit diagram illustrating a current flowing through the pixel circuit shown in FIG. 3 during the initialization period INI according to an exemplary embodiment of the present disclosure. FIG. 5B is a circuit diagram illustrating a current flowing through the pixel circuit shown in FIG. 3 during the sensing period SEN according to an exemplary embodiment of the present disclosure. FIG. 5C is a circuit diagram illustrating a current flowing through the pixel circuit shown in FIG. 3 during the light emission period EMIS according to an exemplary embodiment of the present disclosure.

Referring to FIG. 5A, during the initialization period INI, the voltage of the first scan signal SCAN1, the second-first scan signal SCAN2(N−1), and the EM signal EM is the gate-on voltage VGL. During the initialization period INI, the voltage of the second-second scan signal SCAN2(N) is the gate-off voltage VGH. Therefore, during the initialization period INI, the third to sixth switch elements T13 to T16 are turned on, while the first and second switch elements T11, T12 and driving element DT are turned off. At this time, the voltages of the first and second nodes n1 and n2 are initialized to the reference voltage Vref, and the voltage of the fourth node n4 is initialized to the cathode voltage EVSS. As a result, the capacitor Cst, the gate-source voltage Vgs of the driving element DT, and the light emitting element EL are initialized.

Referring to FIG. 5B, during the sensing period SEN, the pulse of the second-second scan signal SCAN2(N) synchronized with the data voltage Vdata of the pixel data is inputted to the pixel circuit, and the voltage of the first scan signal SCAN1 is the gate-on voltage VGL. During the sensing period SEN, the voltage of the second-first scan signal SCAN2(N−1) and the EM signal EM is the gate-off voltage VGH. Therefore, during the sensing period SEN, the first to third switch elements T11, T12, and T13 are turned on, while the fourth to sixth switch elements T14, T15, and T16 are turned off.

During the sensing period SEN, the data voltage Vdata is applied to the first node n1, and the driving element DT is turned on. When the driving element DT is turned on to increase the voltage of the third node n3, causing the gate voltage of the driving element DT to increase, and then the gate-source voltage Vgs reaches the threshold voltage Vth of the driver DT, the driving element DT is turned off. At this time, (Vdata−EVDD+Vth) is stored in the capacitor Cst. Where 'Vth' is the threshold voltage Vth of the driving element DT. During the sensing period SEN, the anode voltage of the light emitting element EL is discharged up to the cathode voltage EVSS.

A floating time may be optionally set for a predetermined time between the sensing period SEN and the light emission period EMIS. During the floating time, the voltage of the gate signals SCAN1, SCAN2(N−1), SCAN2(N), and EM is the gate-off voltage VGH. Therefore, during the floating time, the main nodes n1 to n4 are floated, and the threshold voltage Vth of the driving element DT may be sensed with respect to the pixels that do not have enough time to sense the threshold voltage of the driving element DT within the 1 horizontal period 1H. As an example, the floating time may be equal to or less than 1 horizontal period 1H, or even larger than 1 horizontal period 1H.

Referring to FIG. 5C, during the light emission period EMIS, the voltage of the scan signals SCAN1, SCAN2(N−1), and SCAN2(N) is the gate-off voltage VGH and the voltage of the EM signal EM is the gate-on voltage VGL. Therefore, during the light emission period EMIS, the fourth and sixth switch elements T14 and T16 are turned on along with the driving element DT, while the first to third switch elements T11, T12, and T13 and the fifth switch element T15 are turned off.

During the light emission period EMIS, the voltage of the first node n1 is changed to the reference voltage Vref and the voltage of the second node n2 is changed to (Vref−Vdata+EVDD+Vth). During the light emission period EMIS, the driving element DT supplies the current generated according to the gate-source voltage Vgs to the light emitting element EL. The light emitting element EL is emitted with a brightness corresponding to a gray scale value of the pixel data during the light emission period EMIS.

In the pixel circuit shown in FIGS. 5A to 5C, since the anode voltage of the light emitting element EL is initialized to the cathode voltage EVSS lower than the reference voltage Vref during the initialization period INI and the sensing period SEN, even if the capacitor Cel of the light emitting element EL is small, the increase of the anode voltage may be reduced or suppressed during these periods INI and SEN to reduce or prevent the light emitting element EL from emitting light. Therefore, there is no luminance increase in the black gray scale for this pixel circuit. During the initialization period INI, the reference voltage Vref is directly applied to both ends of the capacitor Cst to stably initialize the voltage of the capacitor Cst. During the initialization period INI and the sensing period SEN, the fifth switch element T15 that supplies the reference voltage Vref to the gate electrode of the driving element DT, i.e., to the second node n2, is controlled by the second-first scan signal SCAN2(N−1), so that it is not necessary to generate a separate gate signal to control the fifth switch element T15. Therefore, a shift register is not included in the gate driver 120 to generate the gate signal for controlling the fifth switch element T15. As an example, the second-first and second-second scan signals SCAN2(N−1) and SCAN2(N) may be outputted sequentially from one shift register, or from two separate shift registers. In the case of the pixel circuit according to this exemplary embodiment, a low power driving is possible and no circuit is added to the gate driver 120.

Figure 6:
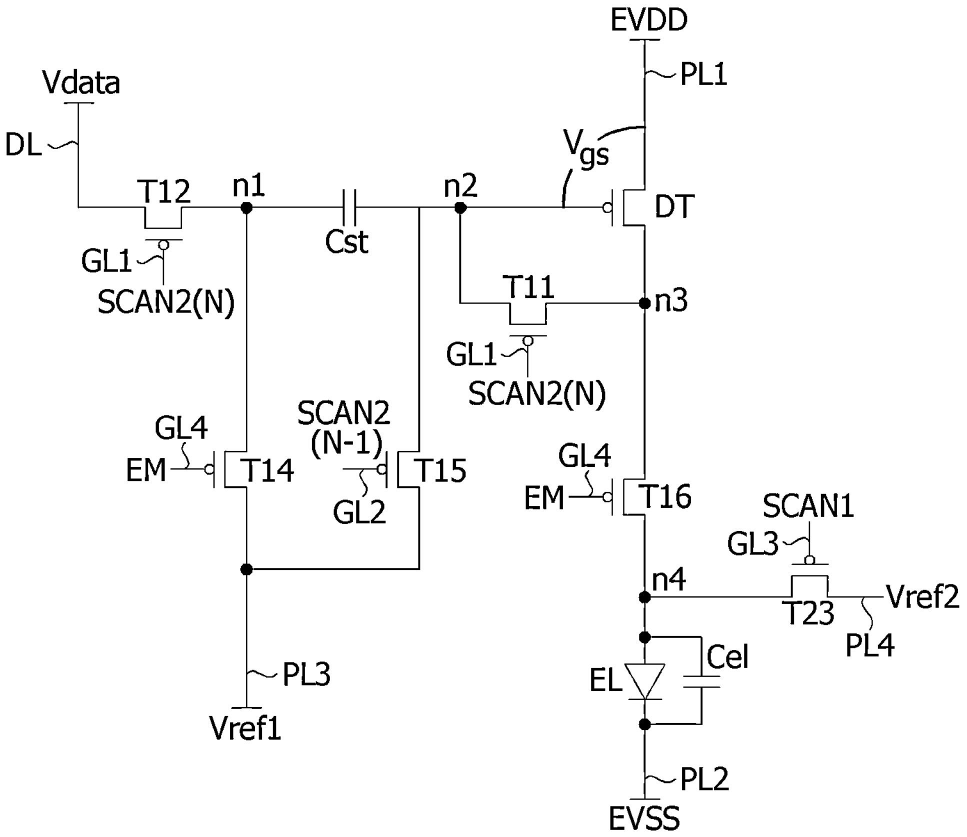
FIG. 6 is a circuit diagram illustrating a pixel circuit including an internal compensation circuit according to a second exemplary embodiment of the present disclosure.

FIG. 6 is a circuit diagram illustrating a pixel circuit including an internal compensation circuit according to a second exemplary embodiment of the present disclosure. The pixel circuit shown in FIG. 6 exemplifies any sub-pixel circuit arranged on an Nth pixel line. The gate signals SCAN1, SCAN2(N−1), SCAN2(N), and EM shown in FIG. 4 are applied to this pixel circuit. In the pixel circuit shown in FIG. 6, the components that are substantially the same as in the pixel circuit shown in FIG. 3 are designated by the same reference numerals and a detailed description thereof is omitted or briefly given.

Referring to FIGS. 4 and 6, the pixel circuit includes a light emitting element EL, a driving element DT driving the light emitting element EL, a plurality of switch elements T11, T12, T23, T14, T15, and T16, and a capacitor Cst.

The pixel circuit is connected to a data line DL to which a data voltage Vdata is applied, and to gate lines GL1 to GL4 to which the gate signals SCAN1, SCAN2(N−1), SCAN2 (N), and EM shown in FIG. 4 are applied.

The pixel circuit is connected to a first constant voltage node PL1 to which a pixel driving voltage EVDD is applied, a second constant voltage node PL2 to which a cathode voltage EVSS is applied, a third constant voltage node PL3 to which a first reference voltage Vref1 is applied, and a fourth constant voltage node PL4 to which a second reference voltage Vref2 is applied. On the display panel 100, the power lines to which the constant voltage nodes are connected may be (e.g., commonly) connected to all pixels.

The pixel driving voltage EVDD is set to a voltage that is higher than the maximum voltage of the data voltage Vdata and allows the driving element DT to operate in the saturation region. The first reference voltage Vref1 may be set to a voltage lower than the pixel driving voltage EVDD and higher than the cathode voltage EVSS. The second reference voltage Vref2 may be set to a voltage lower than the first reference voltage Vref1 and higher than the cathode voltage EVSS, without being limited thereto. As an example, the second reference voltage Vref2 may be set to a voltage equal to or higher than the first reference voltage Vref1. The gate-off voltage VGH may be set to a voltage higher than the pixel driving voltage EVDD, and the gate-on voltage VGL may be set to a voltage lower than the cathode voltage EVSS, without being limited thereto. The voltage levels of the gate-off voltage VGH and the gate-on voltage VGL may be varied based on the type of corresponding transistors. For example, but not limited to, EVDD=13[V], EVSS=0[V], Vref1=2.5[V], Vref2=0~1.5[V], VGH=14[V], VGL=−9[V].

The pixel circuit is driven in the following order: an initialization period INI, a sensing period SEN, and a light emission period EMIS. The initialization period INI, the sensing period SEN, and the light emission period EMIS may be determined by waveforms of the gate signals SCAN2(N−1), SCAN2(N), and EM as shown in FIG. 4.

A third switch element T23 is connected between the fourth node n4 and the fourth constant voltage node PL4 to which the second reference voltage Vref2 is applied. The third switch element T23 is turned on according to the gate-on voltage VGL of the first scan signal SCAN1 during the initialization period INI and the sensing period SEN to initialize the anode voltage of the light emitting element EL to the second reference voltage Vref2. When the third switch element T23 is turned on, the fourth node n4 is connected to the fourth constant voltage node PL4 to which the second reference voltage Vref2 is applied. The third switch element T23 includes a first electrode connected to the fourth node n4, a gate electrode connected to the third gate line GL3 to which the first scan signal SCAN1 is applied, and a second electrode connected to the fourth constant voltage node PL4 to which the second reference voltage Vref2 is applied.

Figure 7A:
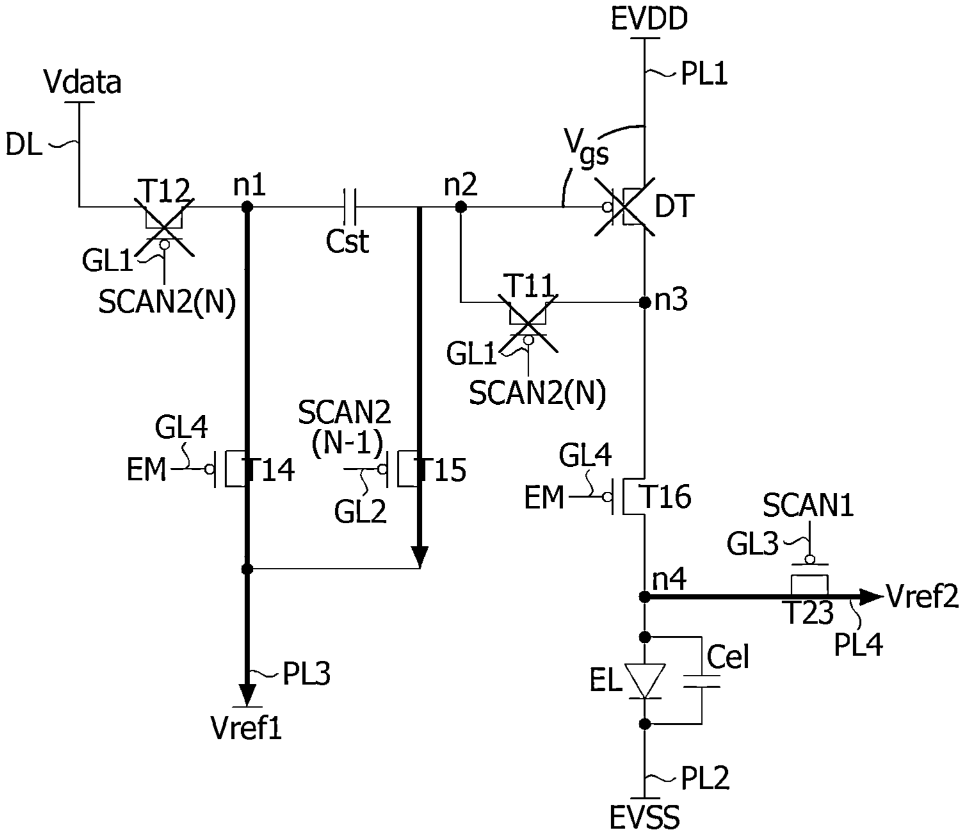
FIGS. 7A to 7C are circuit diagrams illustrating the operation of each internal compensation step of the pixel circuit illustrated in FIG. 6 according to an exemplary embodiment of the present disclosure.
Figure 7B:
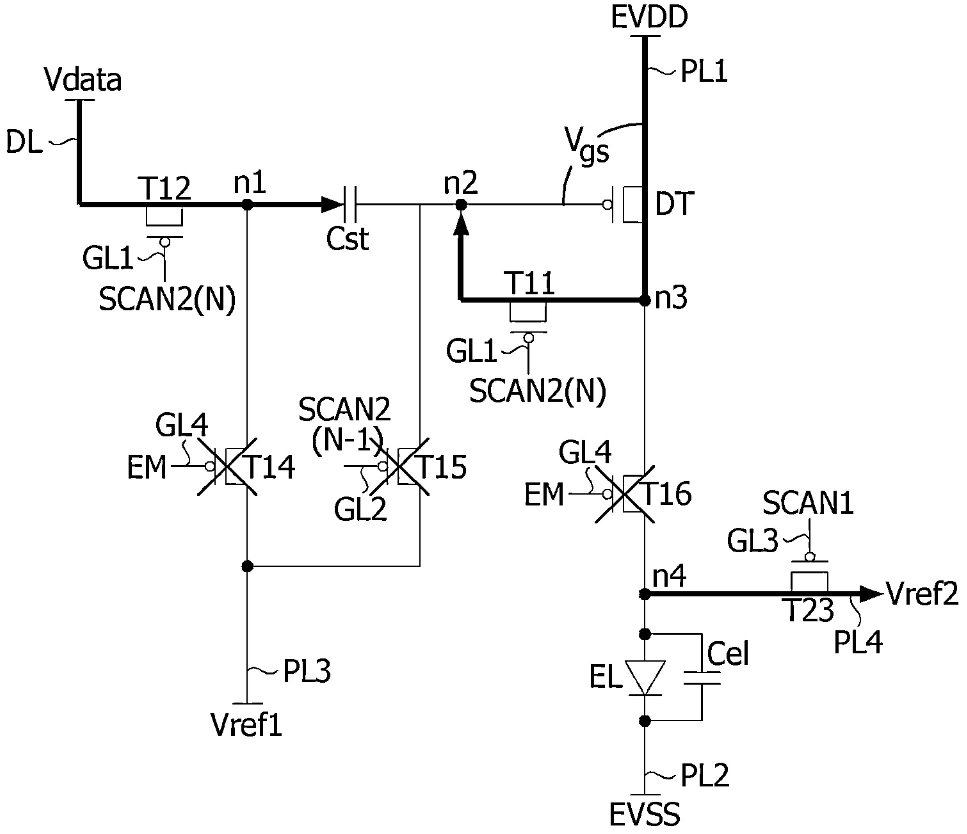
Figure 7C:
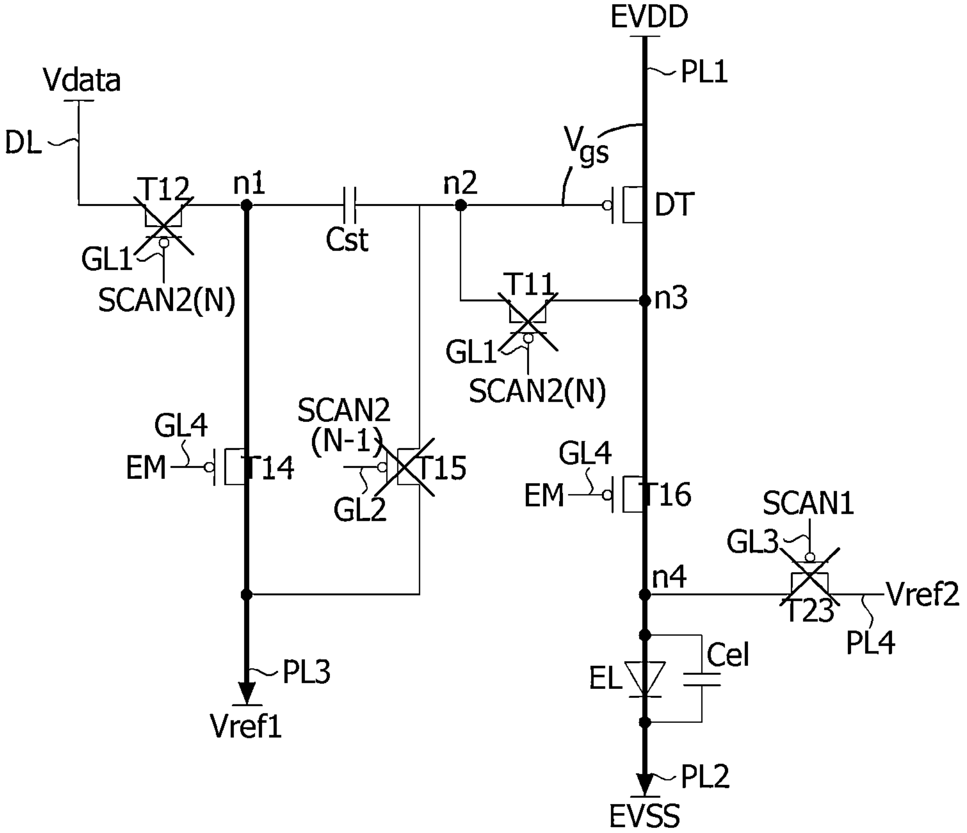

FIGS. 7A to 7C are circuit diagrams illustrating the operation of each internal compensation step of the pixel circuit illustrated in FIG. 6. FIG. 7A is a circuit diagram illustrating a current flowing through the pixel circuit shown in FIG. 6 during the initialization period INI according to an exemplary embodiment of the present disclosure. FIG. 7B is a circuit diagram illustrating a current flowing through the pixel circuit shown in FIG. 6 during the sensing period SEN according to an exemplary embodiment of the present disclosure. FIG. 7C is a circuit diagram illustrating a current flowing through the pixel circuit shown in FIG. 6 during the light emission period EMIS according to an exemplary embodiment of the present disclosure.

Referring to FIGS. 4 and 7A, during the initialization period INI, the voltage of the first scan signal SCAN1, the second-first scan signal SCAN2(N−1), and the EM signal EM is the gate-on voltage VGL. During the initialization period INI, the voltage of the second-second scan signal SCAN2(N) is the gate-off voltage VGH. Therefore, during the initialization period INI, the third to sixth switch elements T23, T14, T15, and T16 are turned on, while the first and second switch elements T11 and T12 are turned off. At this time, the voltages of the first and second nodes n1 and n2 are initialized to the first reference voltage Vref1, and the voltage of the fourth node n4 is initialized to the second reference voltage Vref2. As a result, the capacitor Cst, the gate-source voltage Vgs of the driving element DT, and the light emitting element EL are initialized.

Referring to FIGS. 4 and 7B, during the sensing period SEN, the pulse of the second-second scan signal SCAN2(N) synchronized with the data voltage Vdata of the pixel data is inputted to the pixel circuit, and the voltage of the first scan signal SCAN1 is the gate-on voltage VGL. During the sensing period SEN, the voltage of the second-first scan signal SCAN2(N−1) and the EM signal EM is the gate-off voltage VGH. Therefore, during the sensing period SEN, the first to third switch elements T11, T12, and T23 are turned on, while the fourth to sixth switch elements T14, T15, and T16 are turned off.

During the sensing period SEN, the data voltage Vdata is applied to the first node n1, and the driving element DT is turned on. When the driving element DT is turned on to increase the voltage of the third node n3, causing the gate voltage of the driving element DT to increase, and then the gate-source voltage Vgs reaches the threshold voltage Vth of the driver DT, the driving element DT is turned off. At this time, (Vdata−EVDD+Vth) is stored in the capacitor Cst. During the sensing period SEN, the anode voltage of the light emitting element EL is discharged up to the second reference voltage Vref2 through T23.

During the floating time between the sensing period SEN and light the emission period EMIS, the voltage of the gate signals SCAN1, SCAN2(N−1), SCAN2(N), and EM is the gate-off voltage VGH. During the floating time, the threshold voltage Vth of the driving element DT may be sensed with respect to the pixels that do not have enough time to sense the threshold voltage of the driving element DT within the 1 horizontal period 1H.

Referring to FIGS. 4 and 7C, during the light emission period EMIS, the voltage of the scan signals SCAN1, SCAN2(N−1), and SCAN2(N) is the gate-off voltage VGH and the voltage of the EM signal EM is the gate-on voltage VGL. Therefore, during the light emission period EMIS, the fourth and sixth switch elements T14 and T16 are turned on along with the driving element DT, while the first to third switch elements T11, T12, and T23 and the fifth switch element T15 are turned off.

During light the emission period EMIS, the voltage of the first node n1 is changed to the first reference voltage Vref1 and the voltage of the second node n2 is changed to (Vref1−Vdata+EVDD+Vth). During the light emission period EMIS, the driving element DT supplies the current generated according to the gate-source voltage Vgs to the light emitting element EL. The light emitting element EL is emitted with a brightness corresponding to a gray scale value of the pixel data during the light emission period EMIS.

In the pixel circuit shown in FIG. 6, since the anode voltage of the light emitting element EL is initialized to the second reference voltage Vref2 lower than the first reference voltage Vref1 during the initialization period INI and the sensing period SEN, even if the capacitor Cel of the light emitting element EL is small, the increase of the anode voltage may be reduced or suppressed during these periods INI and SEN to reduce or prevent the light emitting element EL from emitting light. During the initialization period INI, the first reference voltage Vref1 is applied directly to both ends of the capacitor Cst to initialize the voltage of the capacitor Cst stably. During the initialization period INI and the sensing period SEN, the fifth switch element T15 that supplies the first reference voltage Vref1 to the gate node of the driving element DT is controlled by the second-first scan signal SCAN2(N−1), so that it is not necessary to generate a separate gate signal to control the fifth switch element T15.

Figure 8:
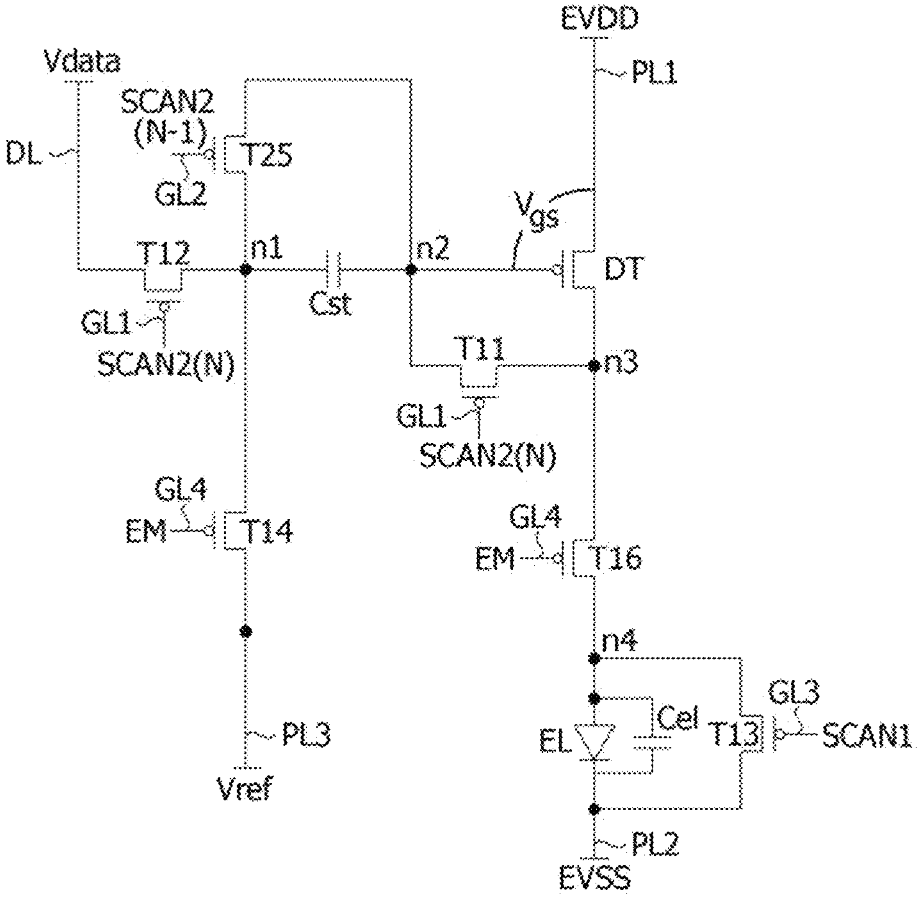
FIG. 8 is a circuit diagram illustrating a pixel circuit including an internal compensation circuit according to a third exemplary embodiment of the present disclosure.

FIG. 8 is a circuit diagram illustrating a pixel circuit including an internal compensation circuit according to a third exemplary embodiment of the present disclosure. The pixel circuit shown in FIG. 8 exemplifies any sub-pixel circuit disposed on an Nth pixel line. The gate signals SCAN1, SCAN2(N−1), SCAN2(N), and EM shown in FIG. 4 are applied to this pixel circuit. In the pixel circuit shown in FIG. 8, the components that are substantially the same as in the pixel circuit shown in FIG. 3 are designated by the same reference numerals and a detailed description thereof is omitted or briefly given.

Referring to FIGS. 4 and 8, the pixel circuit includes a light emitting element EL, a driving element DT driving the light emitting element EL, a plurality of switch elements T11, T12, T13, T14, T25, and T16, and a capacitor Cst.

The pixel circuit is connected to a data line DL to which a data voltage Vdata is applied, and to gate lines GL1 to GL4 to which the gate signals SCAN1, SCAN2(N−1), SCAN2(N), and EM shown in FIG. 4 are applied.

The pixel circuit is connected to power nodes to which DC voltages (or constant voltages) are applied, such as a first constant voltage node PL1 to which a pixel driving voltage EVDD is applied, a second constant voltage node PL2 to which a cathode voltage EVSS is applied, and a third constant voltage node PL3 to which a reference voltage Vref is applied. On the display panel 100, the power lines to which the constant voltage nodes are connected may be (e.g., commonly) connected to all pixels.

The pixel driving voltage EVDD is set to a voltage that is higher than the maximum voltage of the data voltage Vdata and allows the driving element DT to operate in the saturation region. The reference voltage Vref may be set to a voltage lower than the pixel driving voltage EVDD and higher than the cathode voltage EVSS. The gate-off voltage VGH may be set to a voltage higher than the pixel driving voltage EVDD, and the gate-on voltage VGL may be set to a voltage lower than the cathode voltage EVSS, without being limited thereto.

The third switch element T13 is turned on according to the gate-on voltage VGL of the first scan signal SCAN1 during the initialization period INI and the sensing period SEN to initialize the anode voltage of the light emitting element EL to the cathode voltage EVSS. The third switch element T13 includes a first electrode connected to the fourth node n4, a gate electrode connected to the third gate line GL3, and a second electrode connected to the second constant voltage node PL2. The third switch element T13 may be replaced by the third switch element T23 shown in FIG. 6. In this case, during the initialization period INI and the sensing period SEN, the anode voltage of the light emitting element EL may be initialized to the second reference voltage that is lower than the reference voltage Vref and higher than the cathode voltage EVSS.

A fifth switch element T25 is connected between the first node n1 and the second node n2. The fifth switch element T25 is turned on according to the gate-on voltage VGL of the second-first scan signal SCAN2(N−1) during the initialization period INI to connect the first node n1 to the second node n2. The fifth switch element T25 includes a first electrode connected to the first node n1, a gate electrode connected to the second gate line GL2 to which the second-first scan signal SCAN2(N−1) is applied, and a second electrode connected to the second node n2.

Figure 9A:
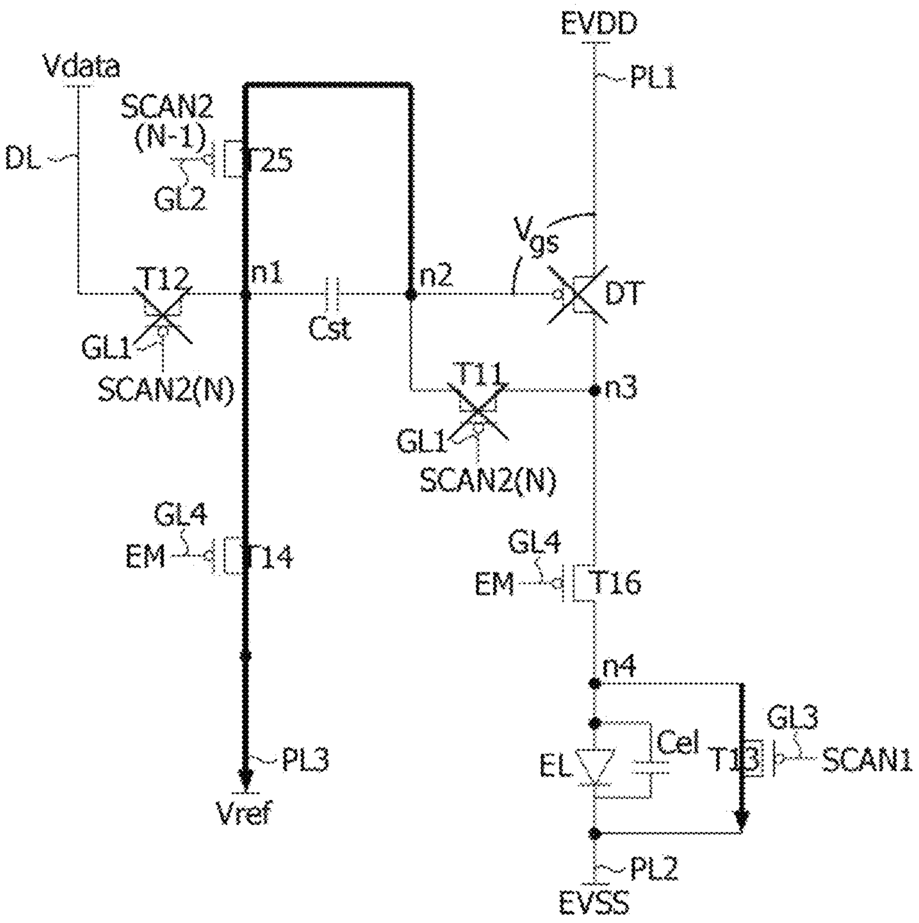
FIGS. 9A to 9C are circuit diagrams illustrating the operation of each internal compensation step of the pixel circuit illustrated in FIG. 8 according to an exemplary embodiment of the present disclosure.
Figure 9B:
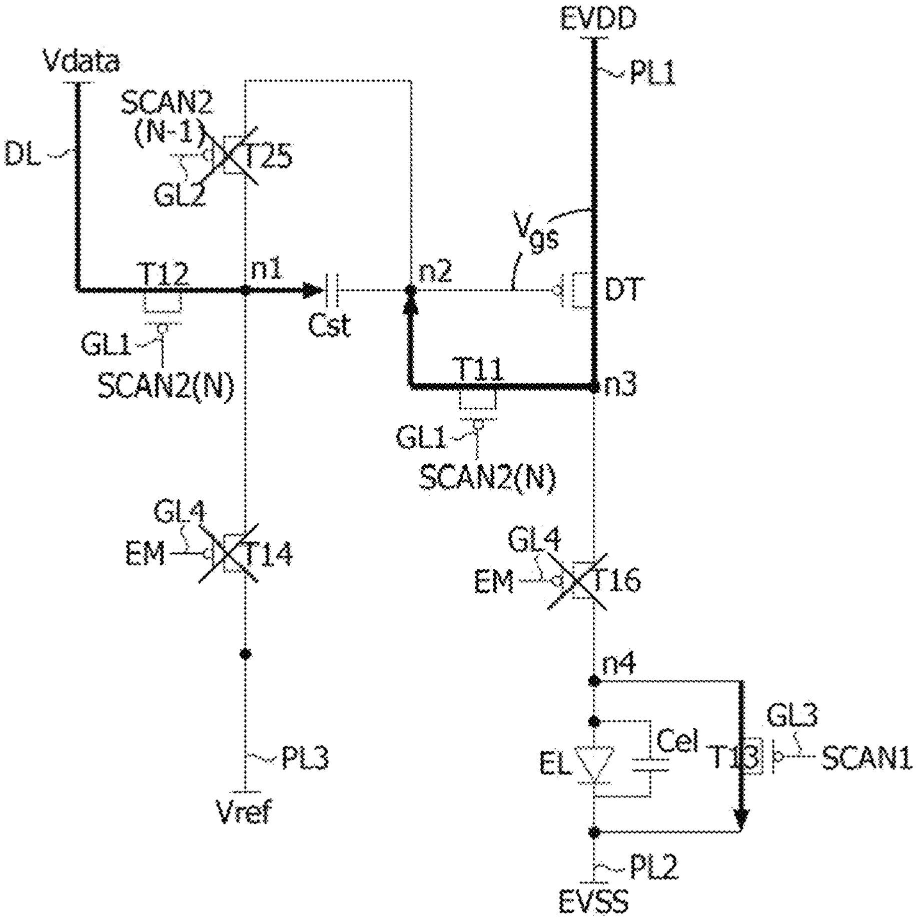
Figure 9C:
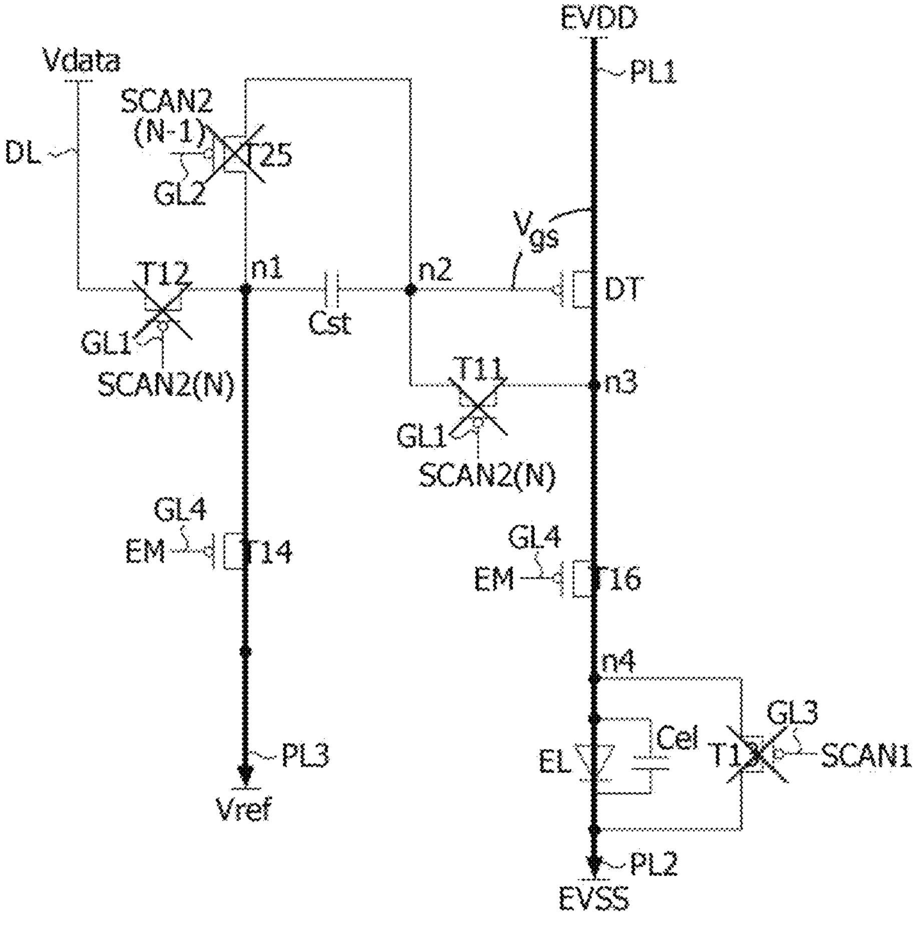

FIGS. 9A to 9C are circuit diagrams illustrating the operation of each internal compensation step of the pixel circuit illustrated in FIG. 8 according to an exemplary embodiment of the present disclosure. FIG. 9A is a circuit diagram illustrating a current flowing through the pixel circuit shown in FIG. 8 during the initialization period INI according to an exemplary embodiment of the present disclosure. FIG. 9B is a circuit diagram illustrating a current flowing through the pixel circuit shown in FIG. 8 during the sensing period SEN according to an exemplary embodiment of the present disclosure. FIG. 9C is a circuit diagram illustrating a current flowing through the pixel circuit shown in FIG. 8 during the light emission period EMIS according to an exemplary embodiment of the present disclosure.

Referring to FIGS. 4 and 9A, during the initialization period INI, the voltages of the first scan signal SCAN1, the second-first scan signal SCAN2(N−1), and the EM signal EM are the gate-on voltage VGL. During the initialization period INI, the voltage of the second-second scan signal SCAN2(N) is the gate-off voltage VGH. Therefore, during the initialization period INI, the third to sixth switch elements T13, T14, T25, and T16 are turned on, while the first and second switch elements T11 and T12 are turned off. At this time, the voltages of the first and second nodes n1 and n2 are initialized to the reference voltage Vref, and the voltage of the fourth node n4 is initialized to the cathode voltage EVSS. As a result, the capacitor Cst, the gate-source voltage Vgs of the driving element DT, and the light emitting element EL are initialized.

Referring to FIGS. 4 and 9B, during the sensing period SEN, the pulse of the second-second scan signal SCAN2(N) synchronized with the data voltage Vdata of the pixel data is inputted to the pixel circuit, and the voltage of the first scan signal SCAN1 is the gate-on voltage VGL. During the sensing period SEN, the voltage of the second-first scan signal SCAN2(N−1) and the EM signal EM is the gate-off voltage VGH. Therefore, during the sensing period SEN, the first to third switch elements T11, T12, and T13 are turned on, while the fourth to sixth switch elements T14, T25, and T16 are turned off.

During the sensing period SEN, the data voltage Vdata is applied to the first node n1, and the driving element DT is turned on. When the driving element DT is turned on to increase the voltage of the third node n3, causing the gate voltage of the driving element DT to increase, and then the gate-source voltage Vgs reaches the threshold voltage Vth of the driver DT, the driving element DT is turned off. At this time, (Vdata−EVDD+Vth) is stored in the capacitor Cst. During the sensing period SEN, the anode voltage of the light emitting element EL is discharged up to the cathode voltage EVSS.

During the floating time between the sensing period SEN and light the emission period EMIS, the voltage of the gate signals SCAN1, SCAN2(N−1), SCAN2(N), and EM is the gate-off voltage VGH. During the floating time, the main nodes n1 to n4 are floated, and the threshold voltage Vth of the driving element DT may be sensed with respect to the pixels that do not have enough time to sense the threshold voltage of the driving element DT within the 1 horizontal period 1H.

Referring to FIGS. 4 and 9C, during the light emission period EMIS, the voltage of the scan signals SCAN1, SCAN2(N−1), and SCAN2(N) is the gate-off voltage VGH and the voltage of the EM signal EM is the gate-on voltage VGL. Therefore, during the light emission period EMIS, the fourth and sixth switch elements T14 and T16 are turned on along with the driving element DT, while the first to third switch elements T11, T12, and T13 and a fifth switch element T25 are turned off.

During the light emission period EMIS, the voltage of the first node n1 is changed to the reference voltage Vref and the voltage of the second node n2 is changed to (Vref−Vdata+EVDD+Vth). During the light emission period EMIS, the driving element DT supplies the current generated according to the gate-source voltage Vgs to the light emitting element EL. The light emitting element EL is emitted with a brightness corresponding to a gray scale value of the pixel data during the light emission period EMIS.

In the pixel circuit shown in FIG. 8, since the anode voltage of the light emitting element EL is initialized to the cathode voltage EVSS lower than the reference voltage Vref during the initialization period INI and the sensing period SEN, even if the capacitor Cel of the light emitting element EL is small, the increase of the anode voltage may be reduced or suppressed during these periods INI and SEN to reduce or prevent the light emitting element EL from emitting light. During the initialization period INI, the reference voltage Vref is directly applied to both ends of the capacitor Cst to stably initialize the voltage of the capacitor Cst. During the initialization period INI and the sensing period SEN, the fifth switch element T25 that supplies the reference voltage Vref to the gate node of the driving element DT is controlled by the second-first scan signal SCAN2(N−1) and thus there is no need to generate a separate gate signal to control the fifth switch element T25.

Figure 10:
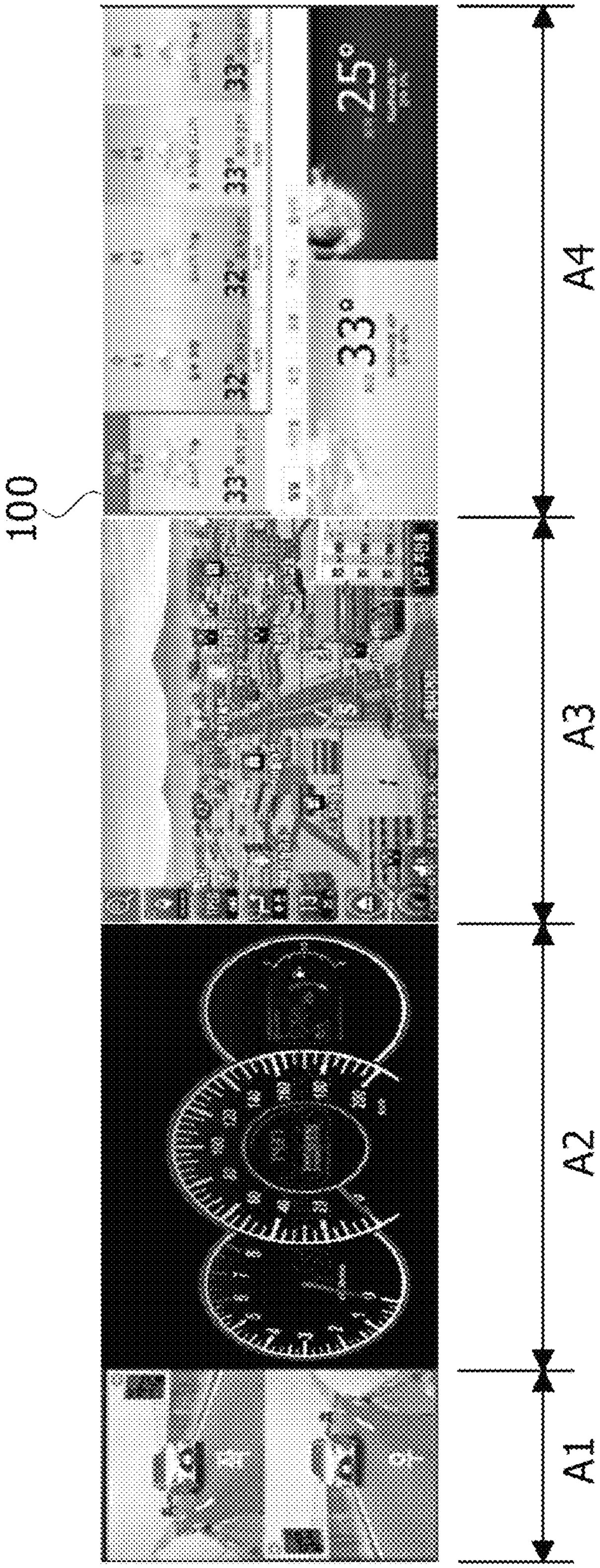
FIG. 10 is a view illustrating an example in which a display device according to one exemplary embodiment of the present disclosure is applied to a vehicle system.
Figure 11:
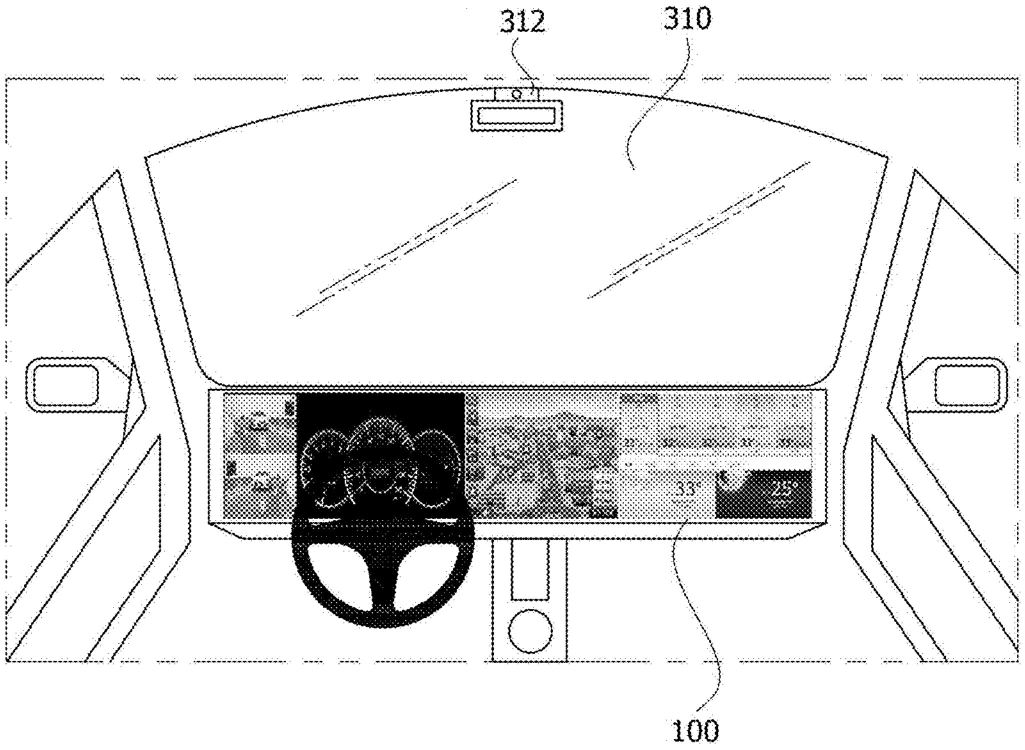
FIG. 11 is a view illustrating an example in which a display device according to one exemplary embodiment of the present disclosure is disposed on a dashboard of a vehicle.

The pixel circuit of the present disclosure is applicable to pixels of a display device connected to a vehicle system, as illustrated in FIGS. 10 and 11, without being limited thereto.

FIG. 10 is a view illustrating an example in which the display device according to one exemplary embodiment of the present disclosure is applied to the vehicle system. FIG. 11 is a view illustrating an example in which the display device according to one exemplary embodiment of the present disclosure is disposed on a dashboard of a vehicle.

Referring to FIGS. 10 and 11, the display device may be widely installed over the dashboard under a windshield 310 of the vehicle. Various information may be visually reproduced on the screen of the display device. In one example, mirror information obtained through cameras disposed on both sides or indoors of the vehicle may be displayed in a first region A1 of the screen. The mirror information may be obtained from the cameras installed on mirrors such as rear view mirrors, wing mirrors, and the like disposed in the exterior or room of the vehicle. A front-facing camera (or dash cam) 312 may be disposed on top of the windshield 310 or near the rear view mirror. Images captured by the front-facing camera 312 may be displayed on a portion of the screen.

In the display device shown in FIG. 10, as an example, each of the pixels may drive at least two light emitting elements EL1 and EL2 with one pixel circuit as shown in FIGS. 12 to 16. Such a pixel circuit may selectively drive the two light emitting elements according to a share mode and a privacy mode. In the privacy mode, light of an image reproduced in the selected region on the screen A1 to A4 may be collected and displayed in a narrow viewing angle. In the share mode, light of an image reproduced in the selected region on the screen A1 to A4 is collected and displayed in a wide viewing angle. Embodiments are not limited thereto. As an example, each of the pixels may drive only one light emitting element with one pixel circuit as shown in FIGS. 12 to 16.

Figure 12:
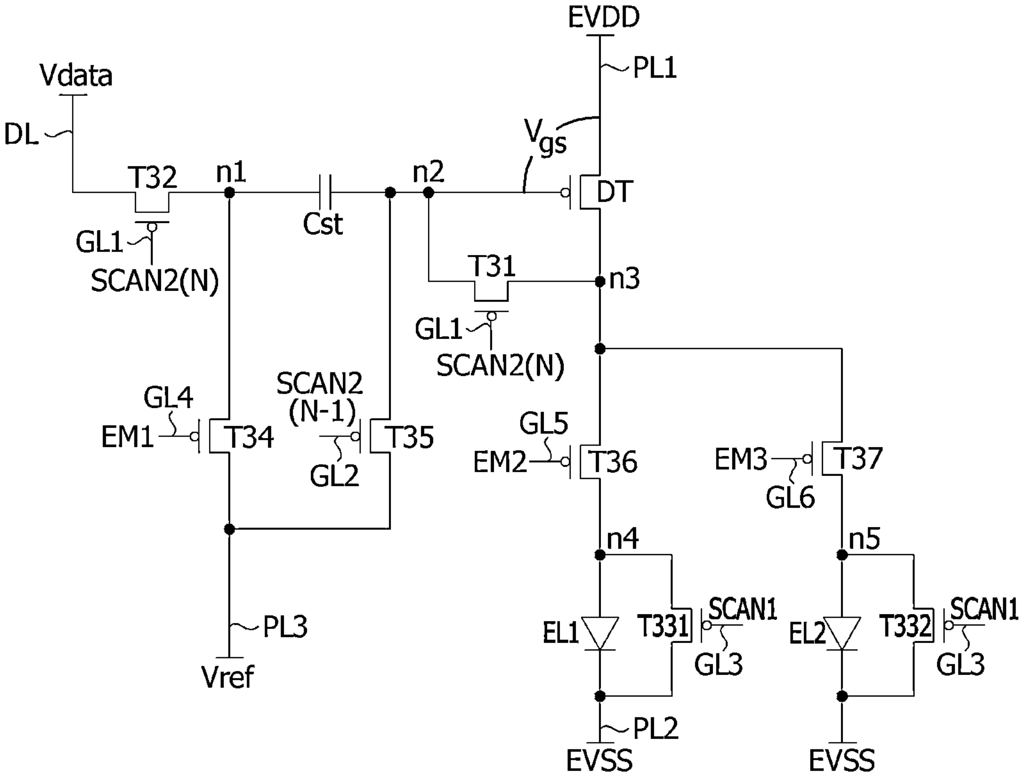
FIG. 12 is a circuit diagram illustrating a pixel circuit including an internal compensation circuit according to a fourth exemplary embodiment of the present disclosure.
Figure 13:
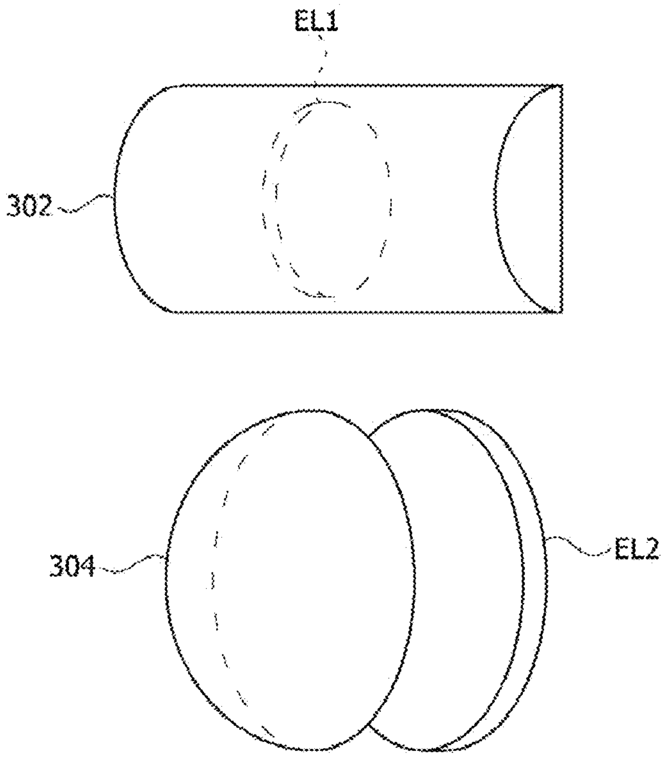
FIG. 13 is a diagram illustrating lenses disposed on the first and second light emitting elements shown in FIG. 12 according to an exemplary embodiment of the present disclosure.
Figure 14A:
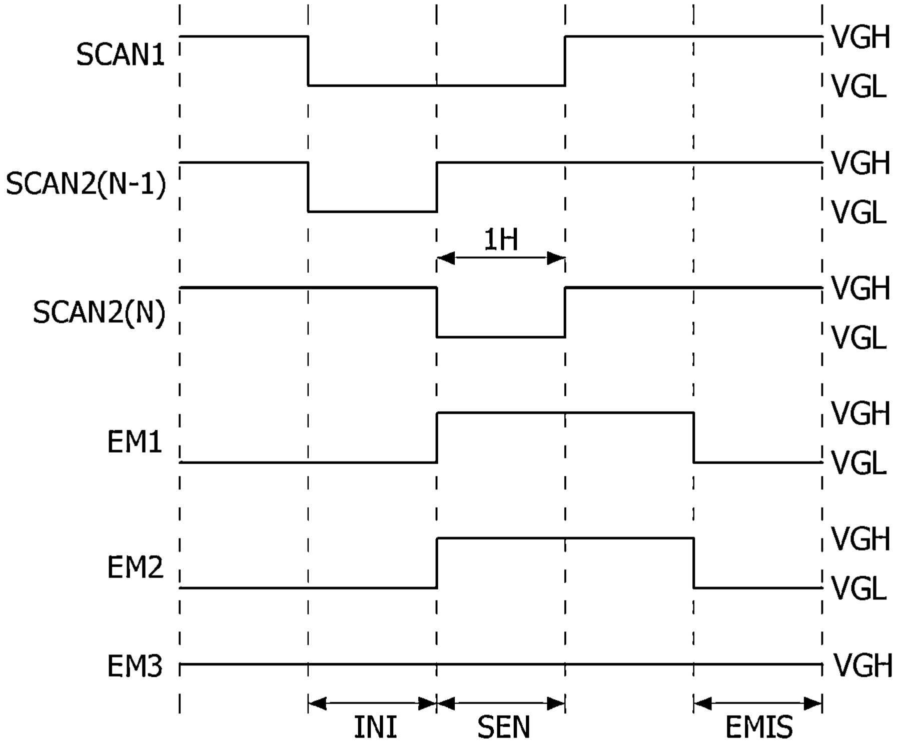
FIGS. 14A and 14B are waveform diagrams illustrating gate signals inputted to the pixel circuit shown in FIG. 12 according to an exemplary embodiment of the present disclosure.
Figure 14B:
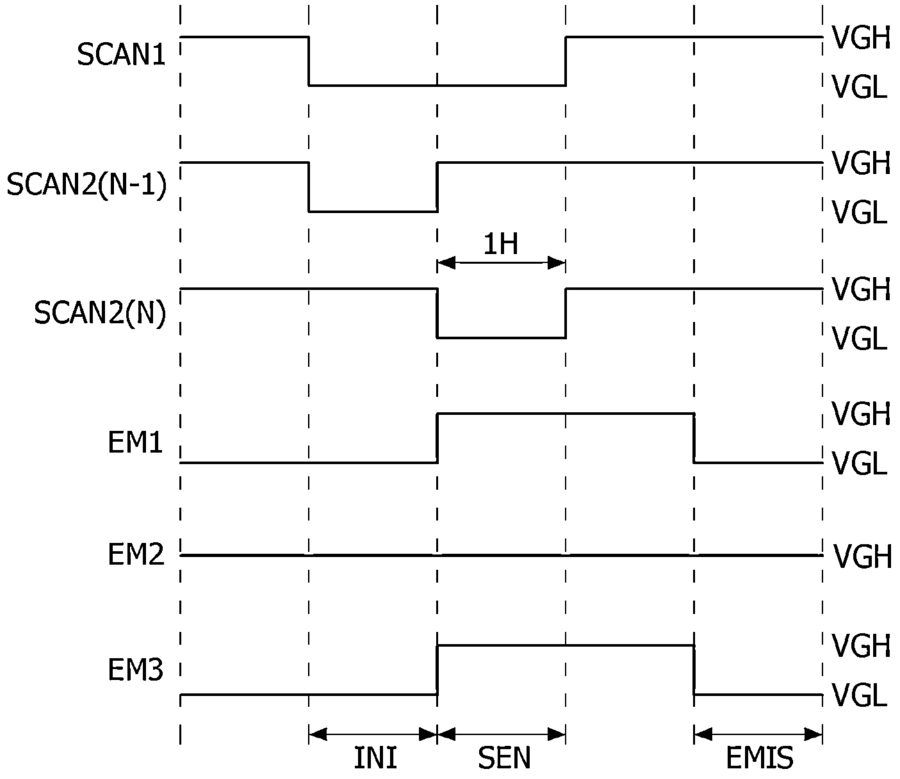

FIG. 12 is a circuit diagram illustrating a pixel circuit including an internal compensation circuit according to a fourth exemplary embodiment of the present disclosure. The pixel circuit shown in FIG. 12 exemplifies any sub-pixel circuit disposed on an Nth pixel line. FIG. 13 is a diagram illustrating lenses disposed on the first and second light emitting elements EL1 and EL2 according to an exemplary embodiment of the present disclosure. FIGS. 14A and 14B are waveform diagrams illustrating gate signals inputted to the pixel circuit shown in FIG. 12 according to an exemplary embodiment of the present disclosure. FIG. 14A is a waveform diagram illustrating gate signals applied to the pixel circuit in the share mode. FIG. 14B is a waveform diagram illustrating gate signals applied to the pixel circuit in the privacy mode. A detailed description of the components of the pixel circuit illustrated in FIG. 12, which are substantially the same as the aforementioned embodiments, will be omitted or briefly given.

Referring to FIGS. 12 to 14B, the pixel circuit includes a first light emitting element EL1, a second light emitting element EL2, a driving element DT driving the light emitting elements EL1 and EL2, a plurality of switch elements T31 to T37, and a capacitor Cst. The driving element DT and the switch elements T31 to T37 may be implemented as, but not limited to, p-channel transistors. As an example, at least one of the driving element DT and the switch elements T31 to T37 may be implemented as a n-channel transistor.

The pixel circuit is connected to a data line DL to which a data voltage Vdata is applied, and to gate lines GL1 to GL6 to which gate signals SCAN1, SCAN2(N−1), SCAN2(N), EM1, EM2, and EM3 are applied.

The pixel circuit is connected to power nodes to which DC voltages (or constant voltages) are applied, such as a first constant voltage node PL1 to which a pixel driving voltage EVDD is applied, a second constant voltage node PL2 to which a cathode voltage EVSS is applied, and a third constant voltage node PL3 to which a reference voltage Vref is applied. On the display panel 100, the power lines to which the constant voltage nodes are connected may be (e.g., commonly) connected to all pixels.

The pixel driving voltage EVDD is set to a voltage that is higher than the maximum voltage of the data voltage Vdata and allows the driving element DT to operate in the saturation region. The reference voltage Vref may be set to a voltage lower than the pixel driving voltage EVDD and higher than the cathode voltage EVSS. The gate-off voltage VGH may be set to a voltage higher than the pixel driving voltage EVDD, and the gate-on voltage VGL may be set to a voltage lower than the cathode voltage EVSS, without being limited thereto.

The gate signals SCAN1, SCAN2(N−1), SCAN2(N), EM1, EM2, and EM3 include pulses that swing between the gate on voltage VGL and the gate off voltage VGH.

The pixel circuit is driven in the following order: an initialization period INI, a sensing period SEN, and a light emission period EMIS. The initialization period INI, the sensing period SEN, and the light emission period EMIS may be determined by waveforms of the gate signals SCAN1, SCAN2(N−1), SCAN2(N), EM1, EM2, and EM3.

The pulses of the second-first and second-second scan signals SCAN2(N−1) and SCAN2(N) include a pulse of the gate-on voltage VGL whose phase is shifted sequentially. The pulses of the second-first and second-second scan signals SCAN2(N−1) and SCAN2(N) have a pulse width of one horizontal period (1H). The first to third EM signals EM1, EM2, and EM3 include a pulse of the gate-off voltage VGH generated during the sensing period SEN. The first to third EM signals EM1, EM2, and EM3 have a pulse width of two horizontal periods.

The second EM signal EM2 is generated as the gate-on voltage VGL during the initialization period INI and the light emission period EMIS in the share mode to turn on a sixth switch element T36, while it is maintained at the gate-off voltage VGH in the privacy mode to control the sixth switch element T36 to the off state. The third EM signal EM3 is maintained at the gate-off voltage VGH in the share mode to control a seventh switch element T37 in the off state, while it is generated as the gate-on voltage VGL during the initialization period INI and the emission period EMIS in the privacy mode to turn on the seventh switch element T37.

The driving element DT includes a first electrode connected to the first constant voltage node PL1 to which the pixel driving voltage EVDD is applied, a gate electrode connected to a second node n2, and a second electrode connected to a third node n3. The capacitor Cst is connected between a first node n1 and the second node n2.

Each of the first and second light emitting elements EL1 and EL2 may be implemented as an OLED, and may include a capacitor, which is omitted from the drawing. The first light emitting element EL1 is emitted in the share mode. An anode electrode of the first light emitting element EL1 is connected to a fourth node n4, and a cathode electrode thereof is connected to the second constant voltage node PL2 to which the cathode voltage EVSS is applied.

A first lens 302 illustrated in FIG. 13 may be disposed on the first light emitting element EL1. Light emitted from the screen of the in-vehicle display device disposed on the dashboard of the vehicle may be transmitted to the front-facing camera 312 so that the screen of the in-vehicle display device can be displayed on the images captured by the front-facing camera 312. The first lens 302 collects the light toward the line of sight of the passengers in the vehicle by limiting the up and down viewing angle to reduce or prevent ghost images on the image captured by the front-facing camera 312. When the light emitted from the first light emitting element EL1 is released to the outside through the first lens 302 in the share mode, the light traveling in the up and down direction or the Y-axis direction of the display panel 100 is collected by the first lens 302. As a result, the up and down viewing angle of the first light emitting element EL1 is comparable to (e.g., equal to or slightly different from) the second light emitting element EL2, and the left and right viewing angle thereof is larger than that of the second light emitting element EL2.

The second light emitting element EL2 is emitted in the privacy mode. An anode electrode of the second light emitting element EL2 is connected to a fifth node n5, and a cathode electrode thereof is connected to the second constant voltage node PL2.

A second lens 304 illustrated in FIG. 13 may be disposed on the second light emitting element EL2. When the light emitted from the second light emitting element EL2 is released to the outside through the second lens 304 in the privacy mode, the light is collected by the second lens 304. As a result, the light emitted from the second light emitting element EL2 is collected in a narrow viewing angle in the up and down direction and the left and right direction.

The first lens 302 may be a semi-cylindrical lens with a hemispherical cross-section. The first lens 302 may be a lens that is elongated in the gate line direction or X-axis direction of the display panel 100 and has a hemispherical cross-section. In contrast, the second lens 302 may be a hemispherical lens. The first and second lenses 302 and 304 may be implemented as a transparent medium or a transparent insulating layer pattern disposed within the display panel 100, but are not limited thereto. The shapes of the first lens 302 and/the second lens 304 are not limited thereto, and could be any shape that could converge light along at least one direction.

A first switch element T31 is turned on according to the gate-on voltage VGL of the second-second scan signal SCAN2(N) during the sensing period SEN in the share mode and the privacy mode to connect a gate electrode and a second electrode of the driving element DT. The first switch element T31 includes a first electrode connected to the second node n2, a gate electrode connected to the first gate line GL1 to which the pulse of the second-second scan signal SCAN2(N) is applied, and a second electrode connected to the third node n3.

A second switch element T32 is turned on according to the gate-on voltage VGL of the second-second scan signal SCAN2(N) during the sensing period SEN in the share mode and the privacy mode to apply the data voltage Vdata of the pixel data to an electrode of the capacitor Cst. The second switch element T32 includes a first electrode connected to the data line DL, a gate electrode connected to the first gate line GL1, and a second electrode connected to the first node n1.

A third-first and a third-second switch elements T331 and T332 are turned on according to the gate-on voltage VGL of the first scan signal SCAN1 during the initialization period INI and the sensing period SEN in the share mode and the privacy mode to initialize the anode voltage of the first and second light emitting elements EL1 and EL2 to the cathode voltage EVSS. The third-first switch element T331 includes a first electrode connected to fourth node n4, a gate electrode connected to the third gate line GL3 to which the first scan signal SCAN1 is applied, and a second electrode connected to the second constant voltage node PL2. The third-second switch element T332 includes a first electrode connected to fifth node n5, a gate electrode connected to the third gate line GL3, and a second electrode connected to the second constant voltage node PL2.

A fourth switch element T34 is turned on according to the gate-on voltage VGL of the first EM signal EM1 during the initialization period INI and the light emission period EMIS in the share mode and the privacy mode to connect the first node n1 to the third constant voltage node PL3 to which the reference voltage Vref is applied. The fourth switch element T34 includes a first electrode connected to the first node n1, a gate electrode connected to the fourth gate line GL4 to which the first EM signal EM1 is applied, and a second electrode connected to the third constant voltage node PL3.

A fifth switch element T35 is turned on according to the gate-on voltage VGL of the second-first scan signal SCAN2 (N−1) during the initialization period INI in the share mode and the privacy mode to connect the second node n2 to the third constant voltage node PL3. The fifth switch element T35 includes a first electrode connected to the second node n2, a gate electrode connected to the second gate line GL2 to which the second-first scan signal SCAN2(N−1) is applied, and a second electrode connected to the third constant voltage node PL3.

A sixth switch element T36 is turned on according to the gate-on voltage VGL of the second EM signal EM2 during the initialization period INI and the light emission period EMIS in the shared mode, as shown in FIG. 14A, to connect the second electrode of the driving element DT to the anode electrode of the first light emitting element EL1. The sixth switch element T36 includes a first electrode connected to the third node n3, a gate electrode connected to a fifth gate line GL5 to which the second EM signal EM2 is applied, and a second electrode connected to the fourth node n4.

A seventh switch element T37 is turned on according to the gate-on voltage VGL of the third EM signal EM3 during the initialization period INI and the light emission period EMIS in the privacy mode, as shown in FIG. 14B, to connect the second electrode of the driving element DT to the anode electrode of the second light emitting element EL2. The seventh switch element T37 includes a first electrode connected to a third node n3, a gate electrode connected to a sixth gate line GL6 to which the third EM signal EM3 is applied, and a second electrode connected to a fifth node n5.

Figure 15:
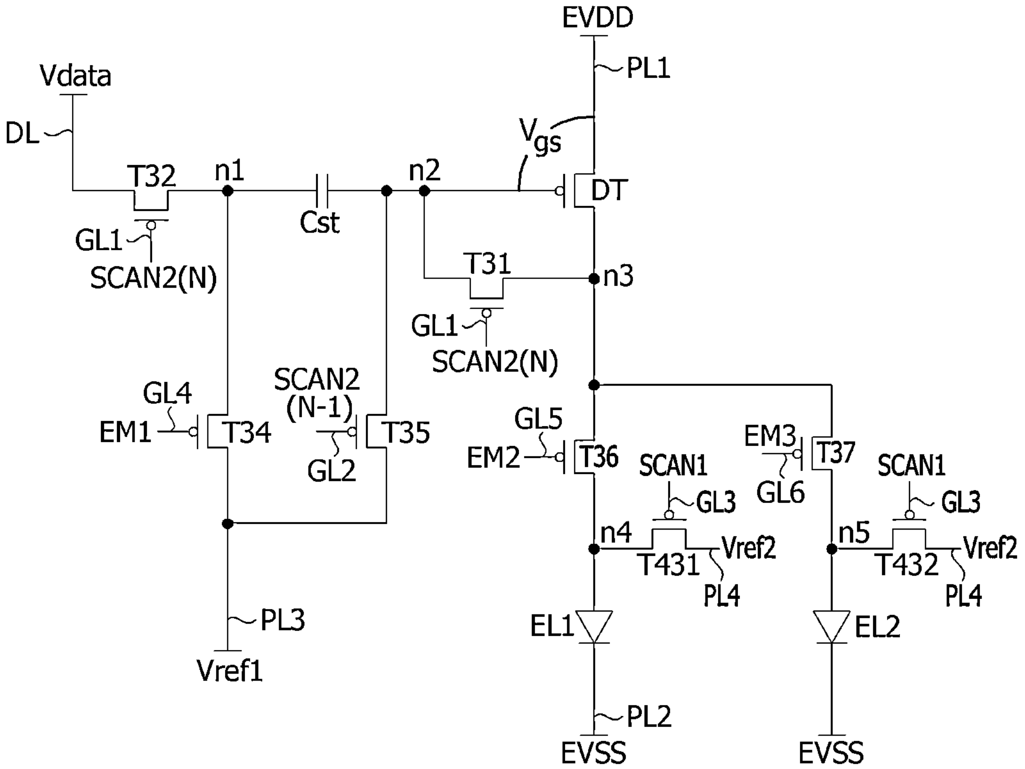
FIG. 15 is a circuit diagram illustrating a pixel circuit including an internal compensation circuit according to a fifth exemplary embodiment of the present disclosure.

FIG. 15 is a circuit diagram illustrating a pixel circuit including an internal compensation circuit according to a fifth exemplary embodiment of the present disclosure. The pixel circuit shown in FIG. 15 exemplifies any sub-pixel circuit disposed on an Nth pixel line. The gate signals SCAN1, SCAN2(N−1), SCAN2(N), EM1, EM2, and EM3 shown in FIGS. 14A and 14B are applied to this pixel circuit. In the pixel circuit shown in FIG. 15, the components that are substantially the same as in the pixel circuit shown in FIG. 12 are designated by the same reference numerals and a detailed description thereof is omitted.

Referring to FIGS. 14A to 15, the pixel circuit includes a first light emitting element EL1, a second light emitting element EL2, a driving element DT driving the light emitting elements EL1 and EL2, a plurality of switch elements T31, T32, T43, T34, T35, T36, and T37, and a capacitor Cst.

The pixel circuit is connected to a data line DL to which a data voltage Vdata is applied, and to gate lines GL1 through GL6 to which the gate signals SCAN1, SCAN2(N−1), SCAN2(N), EM1, EM2, and EM3 shown in FIGS. 14A and 14B are applied.

The pixel circuit is connected to a first constant voltage node PL1 to which a pixel driving voltage EVDD is applied, a second constant voltage node PL2 to which a cathode voltage EVSS is applied, a third constant voltage node PL3 to which a first reference voltage Vref1 is applied, and a fourth constant voltage node PL4 to which a second reference voltage Vref2 is applied. On the display panel 100, the power lines to which the constant voltage nodes are connected may be (e.g., commonly) connected to all pixels.

The pixel driving voltage EVDD is set to a voltage that is higher than the maximum voltage of the data voltage Vdata and allows the driving element DT to operate in the saturation region. The first reference voltage Vref1 may be set to a voltage lower than the pixel driving voltage EVDD and higher than the cathode voltage EVSS. The second reference voltage Vref2 may be set to a voltage lower than the first reference voltage Vref1 and higher than the cathode voltage EVSS, without being limited thereto. The gate-off voltage VGH may be set to a voltage higher than the pixel driving voltage EVDD, and the gate-on voltage VGL may be set to a voltage lower than the cathode voltage EVSS, without being limited thereto.

The pixel circuit is driven in the following order: an initialization period INI, a sensing period SEN, and a light emission period EMIS. The initialization period INI, the sensing period SEN, and the light emission period EMIS may be determined by waveforms of the gate signals SCAN1, SCAN2(N−1), SCAN2(N), EM1, EM2, and EM3 shown in FIGS. 14A and 14B.

A third-first and a third-second switch elements T431 and T432 are turned on according to the gate-on voltage VGL of the first scan signal SCAN1 during the initialization period INI and the sensing period SEN in the share mode and the privacy mode to initialize the anode voltage of the first and second light emitting elements EL1 and EL2 to the second reference voltage Vref2. When the third-first and a third-second switch elements T431 and T432 are turned on, the fourth and fifth nodes n4 and n5 are connected to the fourth constant voltage node PL4 to which the second reference voltage Vref2 is applied. The third-first switch element T431 includes a first electrode connected to the fourth node n4, a gate electrode connected to the third gate line GL3 to which the first scan signal SCAN1 is applied, and a second electrode connected to the fourth constant voltage node PL4 to which the second reference voltage Vref2 is applied. The third-second switch element T432 includes a first electrode connected to the fifth node n5, a gate electrode connected to the third gate line GL3, and a second electrode connected to the fourth constant voltage node PL4.

Figure 16:
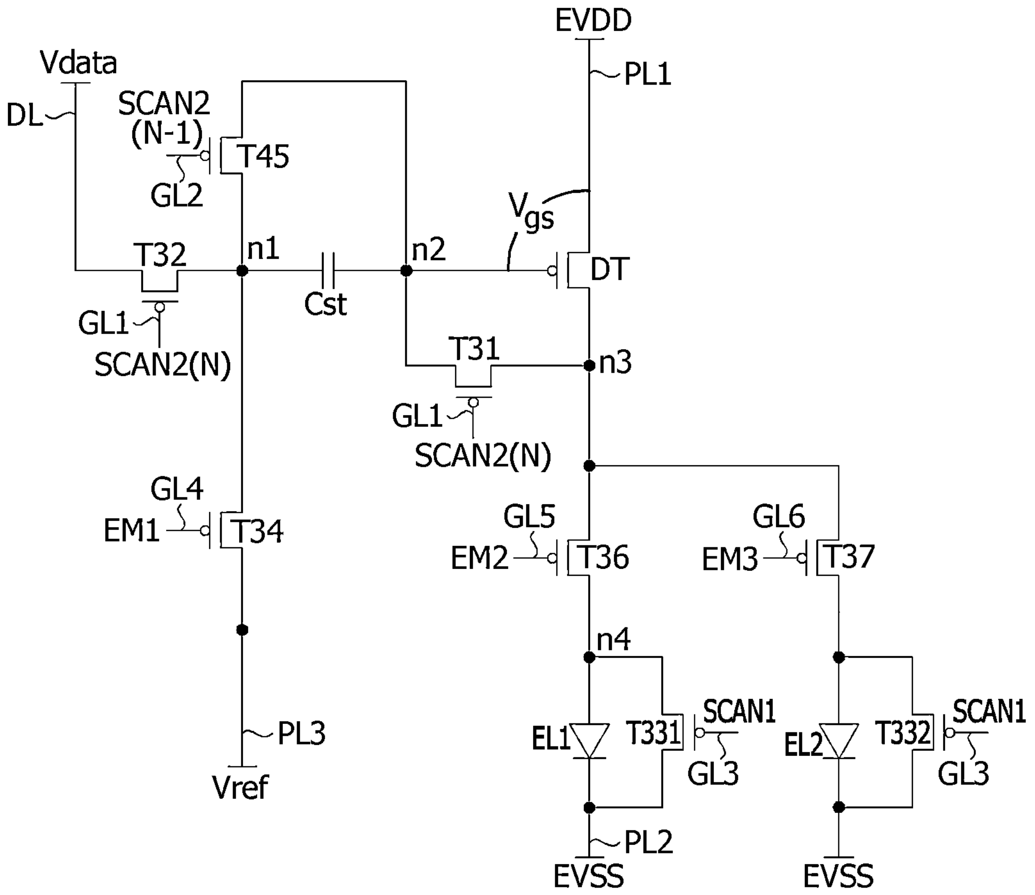
FIG. 16 is a circuit diagram illustrating a pixel circuit including an internal compensation circuit according to a sixth exemplary embodiment of the present disclosure.

FIG. 16 is a circuit diagram illustrating a pixel circuit including an internal compensation circuit according to a sixth exemplary embodiment of the present disclosure. The pixel circuit shown in FIG. 16 exemplifies any sub-pixel circuit disposed on an Nth pixel line. The gate signals SCAN1, SCAN2(N−1), SCAN2(N), EM1, EM2, and EM3 shown in FIGS. 14A and 14B are applied to this pixel circuit. In the pixel circuit shown in FIG. 16, the components that are substantially the same as in the pixel circuit shown in FIG. 12 are designated by the same reference numerals and a detailed description thereof is omitted.

Referring to FIGS. 14A, 14B and 16, the pixel circuit includes a first light emitting element EL1, a second light emitting element EL2, a driving element DT driving the light emitting elements EL1 and EL2, a plurality of switch elements T31, T32, T33, T34, T45, T36, and T37, and a capacitor Cst.

The pixel circuit is connected to a data line DL to which a data voltage Vdata is applied, and to gate lines GL1 through GL6 to which the gate signals SCAN1, SCAN2(N−1), SCAN2(N), EM1, EM2, and EM3 shown in FIGS. 14A and 14B are applied.

The pixel circuit is connected to power nodes to which DC voltages (or constant voltages) are applied, such as a first constant voltage node PL1 to which a pixel driving voltage EVDD is applied, a second constant voltage node PL2 to which a cathode voltage EVSS is applied, and a third constant voltage node PL3 to which a reference voltage Vref is applied. On the display panel 100, the power lines to which the constant voltage nodes are connected may be commonly connected to all pixels.

The pixel driving voltage EVDD is set to a voltage that is higher than the maximum voltage of the data voltage Vdata and allows the driving element DT to operate in the saturation region. The reference voltage Vref may be set to a voltage lower than the pixel driving voltage EVDD and higher than the cathode voltage EVSS. The gate-off voltage VGH may be set to a voltage higher than the pixel driving voltage EVDD, and the gate-on voltage VGL may be set to a voltage lower than the cathode voltage EVSS, without being limited thereto.

A third-first and a third-second switch elements T331 and T332 are turned on according to the gate-on voltage VGL of the first scan signal SCAN1 during the initialization period INI and the sensing period SEN in the share mode and the privacy mode to initialize the anode voltage of the first and second light emitting elements EL1 and EL2 to the cathode voltage EVSS. The third-first switch element T331 includes a first electrode connected to the fourth node n4, a gate electrode connected to the third 5 gate line GL3, and a second electrode connected to the second constant voltage node PL2. The third-second switch element T332 includes a first electrode connected to the fifth node n5, a gate electrode connected to the third gate line GL3, and a second electrode connected to the second constant voltage node PL2. These switch elements T331 and T332 may be replaced by the switch elements T431 and T432 shown in FIG. 15. In this case, during the initialization period INI and the sensing period SEN, the anode voltages of the light emitting elements EL1 and EL2 may be initialized to the second reference voltage that is lower than the reference voltage Vref and higher than the cathode voltage EVSS.

A fifth switch element T45 is turned on according to the gate-on voltage VGL of the second-first scan signal SCAN2(N−1) during the initialization period INI in the share mode and the privacy mode to connect a first node n1 to a second node n2. The fifth switch element T45 includes a first electrode connected to the first node n1, a gate electrode connected to the second gate line GL2 to which the second-first scan signal SCAN2(N−1) is applied, and a second electrode connected to the second node n2.

Although the above description is conducted mainly in the context of a display device of a vehicle, the embodiments are not limited thereto. As an example, the pixel circuit of the present application may be applied to any display devices, such as a television (TV), a set-top box, a navigation system, a personal computer (PC), a home theater device, a mobile system, and a wearable system, etc.

It will be apparent to those skilled in the art that various modifications and variations can be made in the pixel circuit and the display device including the same of the present disclosure without departing from the technical idea or scope of the disclosures. Thus, it may be intended that embodiments of the present disclosure cover the modifications and variations of the disclosure provided they come within the scope of the appended claims and their equivalents.

What is claimed is:

1. A pixel circuit, comprising:

a capacitor coupled between a first node and a second node;

a driving element including a first electrode connected to a first constant voltage node, a gate electrode connected to the second node, and a second electrode connected to a third node;

a light emitting element including an anode electrode connected to a fourth node and a cathode electrode connected to a second constant voltage node;

a first switch element connected between the second node and the third node;

a second switch element connected between a data line to which a data voltage is applied and the first node;

a third switch element connected between the fourth node and the second constant voltage node or between the fourth node and a fourth constant voltage node;

a fourth switch element connected between the first node and a third constant voltage node;

a fifth switch element connected between the second node and the third constant voltage node or between the first node and the second node; and a sixth switch element connected between the third node and the fourth node, wherein the third switch element is turned on in response to the gate-on voltage of a first scan signal to connect the fourth node to the second constant voltage node, or to connect the fourth node to the fourth constant voltage nodes during an initialization period and a sensing period among a driving period of the pixel circuit including an initialization period, a sensing period, and a light emission period.

2. The pixel circuit of claim 1, wherein a pixel driving voltage is applied to the first constant voltage node;

a cathode voltage lower than the pixel driving voltage is applied to the second constant voltage node;

a first reference voltage lower than the pixel driving voltage and higher than the cathode voltage is applied to the third constant voltage node; and a second reference voltage is applied to the fourth constant voltage node.

3. The pixel circuit of claim 2, wherein the second reference voltage is lower than the first reference voltage and higher than the cathode voltage.

4. The pixel circuit of claim 2, wherein:

the fifth switch element is turned on in response to the gate-on voltage of a 2-1st scan signal to connect the second node to the third constant voltage node, or to connect the first node to the second node;

the first switch element is turned on in response to the gate-on voltage of a 2-2nd scan signal to connect the second node to the third node;

the second switch element is turned on in response to the gate-on voltage of the 2-2nd scan signal to connect the data line to the first node;

the fourth switch element is turned on in response to the gate-on voltage of a light emission control signal to connect the first node to the third constant voltage node;

the sixth switch element is turned on in response to the gate-on voltage of the light emission control signal to connect the third node to the fourth node; and the first to sixth switch elements are turned off in response to a gate-off voltage.

5. The pixel circuit of claim 4, wherein:

during the initialization period, the voltage of the first scan signal, the 2-1st scan signal, and the light emission control signal is the gate-on voltage, and during the initialization period, the voltage of the 2-2nd scan signal is the gate-off voltage;

during the sensing period, the voltage of the 2-2nd scan signal and the first scan signal is the gate-on voltage and the voltage of the 2-1st scan signal and the emission control signal is the gate-off voltage; and during the light emission period, the voltage of the first scan signal, the 2-1st scan signal and the 2-2nd scan signal is the gate-off voltage, and the voltage of the light emission control signal is the gate-on voltage.

6. The pixel circuit of claim 4, wherein the first switch element includes a first electrode connected to the second node, a gate electrode to which the 2-2nd scan signal is applied, and a second electrode connected to the third node;

the second switch element includes a first electrode connected to the data line, a gate electrode to which the 2-2nd scan signal is applied, and a second electrode connected to the first node;

the third switch element includes a first electrode connected to the fourth node, a gate electrode to which the first scan signal is applied, and a second electrode connected to the second constant voltage node or the fourth constant voltage node;

the fourth switch element includes a first electrode connected to the first node, a gate electrode to which the light emission control signal is applied, and a second electrode connected to the third constant voltage node;

the fifth switch element includes a first electrode connected to the second node, a gate electrode to which the 2-1st scan signal is applied, and a second electrode connected to the third constant voltage node or the first node; and the sixth switch element includes a first electrode connected to the third node, a gate electrode to which the light emission control signal is applied, and a second electrode connected to the fourth node.

7. The pixel circuit of claim 4, wherein pulses of the 2-1st scan signal and the 2-2nd scan signals have a pulse width of one horizontal period, and a pulse of the light emission control signal has a pulse width of two horizontal periods.

8. A pixel circuit, comprising:

a capacitor coupled between a first node and a second node;

a driving element including a first electrode connected to a first constant voltage node, a gate electrode connected to the second node, and a second electrode connected to a third node;

a first light emitting element including an anode electrode connected to a fourth node and a cathode electrode connected to a second constant voltage node;

a second light emitting element including an anode electrode connected to a fifth node and a cathode electrode to the second constant voltage node;

a first switch element connected between the second node and the third node;

a second switch element connected between a data line to which a data voltage is applied and the first node;

a third switch element connected between the fourth node and the second constant voltage node, between the fourth node and a fourth constant voltage node, between the fifth node and the second constant voltage node, or between the fifth node and the fourth constant voltage node;

a fourth switch element connected between the first node and a third constant voltage node;

a fifth switch element connected between the second node and the third constant voltage node or between the first node and the second node;

a sixth switch element connected between the third node and the fourth element; and a seventh switch element connected between the third node and the fifth node, wherein the third switch element is turned on in response to the gate-on voltage of a first scan signal to connect the fourth node to the second constant voltage node, or to connect the fourth node to the fourth constant voltage nodes, or to connect the fifth node to the second constant voltage node, or to connect the fifth node to the fourth constant voltage nodes during an initialization period and a sensing period among a driving period of the pixel circuit including the initialization period, the sensing period, and a light emission period.

9. The pixel circuit of claim 8, wherein a pixel driving voltage is applied to the first constant voltage node;

a cathode voltage lower than the pixel driving voltage is applied to the second constant voltage node;

a first reference voltage lower than the pixel driving voltage and higher than the cathode voltage is applied to the third constant voltage node; and a second reference voltage is applied to the fourth constant voltage node.

10. The pixel circuit of claim 9, wherein the second reference voltage is lower than the first reference voltage and higher than the cathode voltage.

11. The pixel circuit of claim 9, wherein:

the fifth switch element is turned on in response to the gate-on voltage of a 2-1st scan signal to connect the second node to the third constant voltage node, or to connect the first node to the second node;

the first switch element is turned on in response to the gate-on voltage of a 2-2nd scan signal to connect the second node to the third node;

the second switch element is turned on in response to the gate-on voltage of the 2-2nd scan signal to connect the data line to the first node;

the fourth switch element is turned on in response to the gate-on voltage of the first light emission control signal to connect the first node to the third constant voltage node;

the sixth switch element is turned on in response to the gate-on voltage of the second light emission control signal to connect the third node to the fourth node;

the seventh switch element is turned on in response to the gate-on voltage of the third light emission control signal to connect the third node to the fifth node; and the first to seventh switch elements are turned off in response to a gate-off voltage.

12. The pixel circuit of claim 11, wherein:

during the initialization period, the voltage of the first scan signal, the 2-1st scan signal, and the first light emission control signal is the gate-on voltage, and during the initialization period, the voltage of the 2-2nd scan signal is the gate-off voltage;

during the sensing period, the voltage of the 2-2nd scan signal and the first scan signal is the gate-on voltage, and the voltage of the 2-1st scan signal and the first emission control signal is the gate-off voltage;

during the light emission period, the voltage of the first scan signal, the 2-1st scan signal, and the 2-2nd scan signal is the gate-off voltage, and the voltage of the first light emission control signal is the gate-on voltage;

the second light emission control signal is the gate-on voltage during the initialization period and the light emission period in the share mode, and is the gate-off voltage in the privacy mode; and the third light-emitting signal is a gate-off voltage in the share mode and a gate-on voltage during the initialization period and the light-emitting period in the privacy mode.

13. The pixel circuit of claim 8, wherein the first light emitting element emits light in a share mode, and the second light emitting element emits light in a privacy mode, and wherein a viewing angle of the first light emitting element is larger than that of the second light emitting element.

14. The pixel circuit of claim 8, further comprising:

a first lens disposed on the first light emitting element; and a second lens disposed on the second light emitting element, wherein the first lens and the second lens have different shapes.

15. The pixel circuit of claim 14, wherein the first lens is a semi-cylindrical lens with a hemispherical cross-section; and the second lens is a hemispherical lens.

16. A display device, comprising:

a display panel in which a plurality of data lines, a plurality of gate lines, and a plurality of pixel circuits;

a data driver configured to output a data voltage of pixel data to the data lines; and a gate driver configured to output the gate signals to the gate lines, each of pixel circuits includes:

a capacitor coupled between a first node and a second node;

a driving element including a first electrode connected to a first constant voltage node, a gate electrode connected to the second node, and a second electrode connected to a third node;

a light emitting element including an anode electrode connected to a fourth node and a cathode electrode connected to a second constant voltage node;

a first switch element connected between the second node and the third node;

a second switch element connected between a data line to which a data voltage is applied and the first node;

a third switch element connected between the fourth node and the second constant voltage node or between the fourth node and a fourth constant voltage node;

a fourth switch element connected between the first node and a third constant voltage node;

a fifth switch element connected between the second node and the third constant voltage node or between the first node and the second node; and a sixth switch element connected between the third node and the fourth node, wherein the third switch element is turned on in response to the gate-on voltage of a first scan signal to connect the fourth node to the second constant voltage node, or to connect the fourth node to the fourth constant voltage nodes during an initialization period and a sensing period among a driving period of the pixel circuit including an initialization period, a sensing period, and a light emission period.

17. The display device of claim 16, wherein a pixel driving voltage is applied to the first constant voltage node;

a cathode voltage lower than the pixel driving voltage is applied to the second constant voltage node;

a first reference voltage lower than the pixel driving voltage and higher than the cathode voltage is applied to the third constant voltage node.

18. The display device of claim 17, wherein the second reference voltage is lower than the first reference voltage and higher than the cathode voltage.

19. The display device of claim 17, wherein the third switch element is turned on in response to the gate-on voltage of a first scan signal to connect the fourth node to the second constant voltage node, or to connect the fourth node to the fourth constant voltage nodes;

the fifth switch element is turned on in response to the gate-on voltage of a 2-1st scan signal to connect the second node to the third constant voltage node, or to connect the first node to the second node;

the first switch element is turned on in response to the gate-on voltage of a 2-2nd scan signal to connect the second node to the third node;

the second switch element is turned on in response to the gate-on voltage of a 2-2nd scan signal to connect the data line to the first node;

the fourth switch element is turned on in response to the gate-on voltage of a light emission control signal to connect the first node to the third constant voltage node;

the sixth switch element is turned on in response to the gate-on voltage of the light emission control signal to connect the third node to the fourth node; and the first to sixth switch elements are turned off in response to a gate-off voltage.

20. The display device of claim 16, wherein the gate signals includes:

the first scan signal, which is the gate-on voltage during the initialization period and the sensing period and the gate-off voltage during the light emission period;

a 2-1st scan signal, which is the gate-on voltage during the initialization period and the gate-off voltage during the sensing period and the light emission period;

a 2-2nd scan signal, which is the gate-on voltage during the sensing period and the gate-off voltage during the initialization period and the light emission period; and a light emission control signal, which is the gate-on voltage during the initialization period and the light emission period and the gate-off voltage during the sensing period.

* * * * *